US010558757B2

(12) United States Patent
Fan et al.

(10) Patent No.: US 10,558,757 B2
(45) Date of Patent: Feb. 11, 2020

(54) SYMBOL MANAGEMENT

(71) Applicant: International Business Machines Corporation, Armonk, NY (US)

(72) Inventors: Si Bin Fan, Beijing (CN); Su Liu, Austin, TX (US); Yu Iu Liu, Beijing (CN); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/456,519

(22) Filed: Mar. 11, 2017

(65) Prior Publication Data
US 2018/0260385 A1 Sep. 13, 2018

(51) Int. Cl.
*G06F 17/27* (2006.01)

(52) U.S. Cl.
CPC ........ *G06F 17/2785* (2013.01); *G06F 17/276* (2013.01); *G06F 17/2705* (2013.01)

(58) Field of Classification Search
CPC . G06F 17/2705; G06F 17/2735; G10L 13/08; G10L 2013/083
USPC ..................................... 704/9, 260
See application file for complete search history.

(56) References Cited

U.S. PATENT DOCUMENTS

| | | | | |
|---|---|---|---|---|
| 6,292,768 B1 * | 9/2001 | Chan | ..... | G06Q 40/02 704/1 |
| 9,043,196 B1 * | 5/2015 | Leydon | ..... | G07F 17/3244 704/4 |
| 9,418,375 B1 * | 8/2016 | Cunico | ..... | G06F 17/2765 |
| 9,665,567 B2 | 5/2017 | Liu et al. | | |
| 2011/0202512 A1 * | 8/2011 | Pantanelli | ..... | G06F 17/2785 707/706 |
| 2014/0303964 A1 * | 10/2014 | Kennard | ..... | G06F 17/2735 704/10 |
| 2015/0106080 A1 | 4/2015 | Miura et al. | | |
| 2016/0042359 A1 | 2/2016 | Singh | | |
| 2016/0163332 A1 * | 6/2016 | Un | ..... | G10L 13/08 704/260 |
| 2016/0342683 A1 * | 11/2016 | Lim | ..... | G06F 17/2775 |
| 2017/0083491 A1 | 3/2017 | Kumhyr et al. | | |
| 2017/0098122 A1 * | 4/2017 | el Kaliouby | ..... | A61B 5/744 |
| 2017/0154055 A1 * | 6/2017 | Dimson | ..... | G06F 16/5838 |

(Continued)

FOREIGN PATENT DOCUMENTS

JP        2016173742 A        9/2016

OTHER PUBLICATIONS

Novak et al.; "Sentiment of Emojis"; PLOS ONE; Dec. 7, 2015. <http://journals.plos.org/plosone/article?id=10.1371/journal.pone.0144296>.

(Continued)

*Primary Examiner* — Jakieda R Jackson
(74) *Attorney, Agent, or Firm* — Matthew J. Bussan

(57) ABSTRACT

Disclosed aspects relate to symbol management. A set of depictogram usage information may be mined with respect to a set of depictograms. A set of language attributes for the set of depictograms may be determined based on the set of depictogram usage information. A depictogram reference object may be compiled using the set of language attributes for the set of depictograms. A set of input data which includes a subset of the set of depictograms may be analyzed. The subset of the set of depictograms may be evaluated using the depictogram reference object. A set of output data may be provided.

19 Claims, 15 Drawing Sheets

(56) References Cited

U.S. PATENT DOCUMENTS

2017/0169463 A1\* 6/2017 Couvillon .......... G06Q 30/0245
2017/0177554 A1 6/2017 Emmons et al.

OTHER PUBLICATIONS

Bobology.com; "6 Things to Know about Emoji and Emoticons". <http://www.bobology.com/public/6-Things-to-Know-about-Emoji-and-Emoticons.cfm>.
Mell, Peter, et al., The NIST Definition of Cloud Computing, National Institute of Standards and Technology, Oct. 7, 2009, Version 15, NIST, Gaithersburg, MD, US.
Blagdon, Jeff; "How emoji conquered the world"; The Verge; Mar. 4, 2013. <http://www.theverge.com/2013/3/4/3966140/how-emoji-conquered-the-world>.
Unicode, Inc.; "Unicode® Emoji Charts v4.0"; Unicode.org. <http://unicode.org/emoji/charts/index.html>.
Chalabi, Mona; "The 100 Most-Used Emojis"; FiveThirtyEight; Jun. 5, 2014. <https://fivethirtyeight.com/datalab/the-100-most-used-emojis/>.
Emojipedia Pty Ltd; "Emojipedia"; Emojipedia. <http://emojipedia.org/>.
Caire, Tamara; "Search the web on Bing using emoji"; Oct. 29, 2014. <http://blog.dbgtechnologies.com.au/news/search-web-bing-using-emoji/>.
Unruh, Amy; "Search API Basics"; Google; Oct. 2012. <https://cloud.google.com/appengine/training/fts_intro/lesson2>.

\* cited by examiner

SYMBOL MANAGEMENT

BACKGROUND

This disclosure relates generally to computer systems and, more particularly, relates to depictogram management. The amount of data that needs to be managed by enterprises is increasing. New depictograms may be created, or past depictograms may have meanings which morph or change. In some situations, the meaning of a depictogram may be ambiguous, or may convey different meanings to users of various backgrounds. Additionally, the use of depictograms may pose challenges with respect to machine learning techniques or natural language processing services.

As depictograms needing to be managed increases, the need for depictogram management may also increase. For example, a dictionary or thesaurus for depictograms with respect to one or more languages, cultures, locales, or user groups may be useful as described herein. Uses for such a depictogram dictionary might include analyzing data that includes depictograms to provide an interpretation of the meaning and context of the data. In various environments, the depictogram dictionary may be utilized to benefit machine learning techniques and services. As such, the a dictionary or thesaurus for depictograms may promote communication accuracy and clarity which may be otherwise lacking.

For example, the meaning of emoji may be vague, or may convey more than one possible understanding to users of different cultural or linguistic backgrounds. Additionally, the use of emoji may pose challenges with respect to natural language processing services, as the presence of emoji may complicate text segmentation and filtering. Accordingly, aspects of the disclosure relate to building an emoji reference object to maintain language attributes for emoji characters with respect to one or more languages, cultures, locales, or user groups. The emoji reference object may be used to evaluate content that includes emojis to provide an interpretation of the meaning and context of the content. The emoji reference object may be used to facilitate flexibility and performance of natural language processing techniques and services.

SUMMARY

Aspects of the disclosure relate to depictogram management. A depictogram reference object to indicate depictogram character and depictogram phrase meanings for different languages and user groups may be built and maintained. Depictogram names, meanings, and phonetic mapping tables may be created and stored with respect to the depictogram reference object. Social media, public forums, and other communication environments may be searched to collect information regarding depictogram character usage, usage context, examples, discussions and other data related to depictogram characters. The meanings of a depictogram character or depictogram phrase may be normalized and mapped to particular language or user groups to assemble the depictogram reference object. The depictogram reference object may be used to evaluate the meaning of depictogram characters of a set of input data and provide an indication of the meaning and other language attributes for the set of depictogram characters within the set of input data.

Disclosed aspects relate to depictogram management. A set of depictogram usage information may be mined with respect to a set of depictograms. A set of language attributes for the set of depictograms may be determined based on the set of depictogram usage information. A depictogram reference object may be compiled using the set of language attributes for the set of depictograms. A set of input data which includes a subset of the set of depictograms may be analyzed. The subset of the set of depictograms may be evaluated using the depictogram reference object. A set of output data may be provided. Leveraging the depictogram reference object with respect to a set of depictograms may facilitate communication clarity, accuracy, and efficiency. Altogether, aspects of the disclosure can have performance or efficiency benefits. Aspects may save resources such as bandwidth, disk, processing, or memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
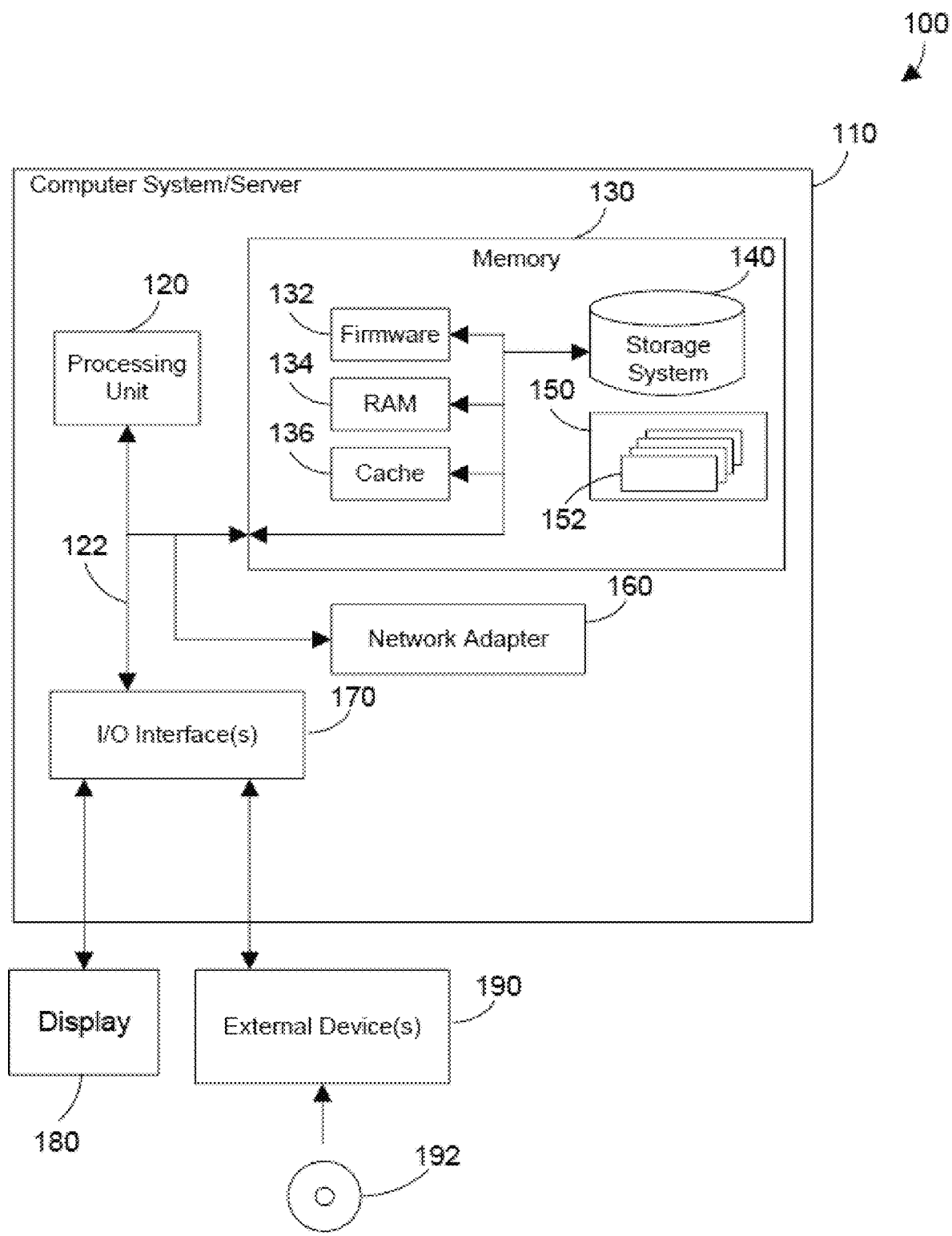
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to depictogram management (e.g., emoji management or emoji data management). A depictogram reference object (e.g., an emoji reference object such as an emoji dictionary) to indicate depictogram and depictogram phrase meanings (e.g., emoji character and emoji phrase meanings) for different languages and user groups may be built and maintained. Depictogram/emoji names, meanings, and phonetic mapping tables may be created (e.g., from depictogram/emoji repositories, social media vendors, definition indexes) and stored with respect to the depictogram/emoji reference object. Social media, public forums, and other communication environments may be searched to collect information regarding depictogram character usage, usage context, examples, discussions and other data related to depictograms (e.g., emojis or emoji characters). The meanings of a depictogram or a depictogram phrase (e.g., emoji phrase) may be normalized and mapped to particular language or user groups to assemble the depictogram reference object. The depictogram reference object may be used to evaluate the meaning of depictograms of a set of input data (e.g., text/email message or other communication) and provide an indication of the meaning and other language attributes for the set of depictograms within the set of input data. Leveraging use of a depictogram reference object with respect to a set of depictograms may facilitate communication clarity, accuracy, and efficiency.

A depictogram can include an ideogram (e.g., a graphic symbol that represents an idea or concept, independent of any particular language, and specific words or phrases), a pictogram/pictograph (e.g., an ideogram that conveys its meaning through its pictorial resemblance to a physical object such as when used in writing and graphic systems in which the characters are to a considerable extent pictorial in appearance), a logogram/logograph (e.g., a written character that represents a word or phrase), a hieroglyph (e.g., an artistic representation of an esoteric idea), or the like such as an emoji. Emoji are one tool that can be used to convey thoughts, ideas, concepts, and representations of objects between users in digital communication environments (e.g., text messages, emails, social media). An emoji can include a complete or thorough meaning and thought behind an image or picture. Aspects of the disclosure relate to the recognition that, in some situations, the meaning of emoji may be ambiguous, or may convey different meanings to users of different cultural or linguistic backgrounds. Additionally, the use of emoji may pose challenges with respect to natural language processing services, as the presence of emoji may complicate text segmentation and filtering. Accordingly, aspects of the disclosure relate to building an emoji reference object to maintain language attributes (e.g., meaning, usage, nuances, context) for emoji characters with respect to one or more languages, cultures, locales, or user groups. The emoji reference object may be used to evaluate content that includes emojis (e.g., social media messages) to provide an interpretation of the meaning and context of the content. The emoji reference object may be used to facilitate flexibility and performance of natural language processing techniques and services. As such, the emoji reference object may promote communication accuracy and clarity.

Aspects of the disclosure relate to depictograms which may be described in context as emojis to represent one or more examples of the various features. As such, the disclosure is not limited to emojis but rather includes depictograms as described herein. Aspects described herein with respect to an emoji, emoji data, emoji character(s), emoji reference object(s), emoji usage information or the like may be thought of as representative of an example depictogram, ideogram, pictogram, logogram, hieroglyph, or the like (e.g., depictogram data, depictogram characters, depictogram reference object, depictogram usage information). Accordingly, aspects described herein include a method, system, and computer program product for emoji data management. A set of emoji usage information may be mined with respect to a set of emoji characters. A set of language attributes for the set of emoji characters may be determined based on the set of emoji usage information. An emoji reference object may be compiled using the set of language attributes for the set of emoji characters. A set of input data which includes a subset of the set of emoji characters may be analyzed. The subset of the set of emoji characters may be evaluated using the emoji reference object. A set of output data may be provided.

In embodiments, a set of input data which includes a subset of the set of emoji characters may be analyzed, the subset of the set of emoji characters may be evaluated using the emoji reference object, and a set of output data which indicates a subset of the set of language attributes for the subset of the set of emoji characters may be provided. In embodiments, a data structure may be created to map the set of emoji characters with the set of language attributes, a first language attribute which corresponds with a particular emoji in a particular record of the data structure may be populated using a first emoji information source, and a second language attribute which corresponds with the particular emoji in the particular record of the data structure may be populated using a second emoji information source. In embodiments, an accessible environment may be searched for a set of use-cases of the set of emoji characters, and a set of emoji-use context data which corresponds with the set of use-cases of the set of emoji characters may be collected from the accessible environment. Altogether, aspects of the disclosure can have performance or efficiency benefits. Aspects may save resources such as bandwidth, disk, processing, or memory (e.g., thereby improving how a computer operates).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
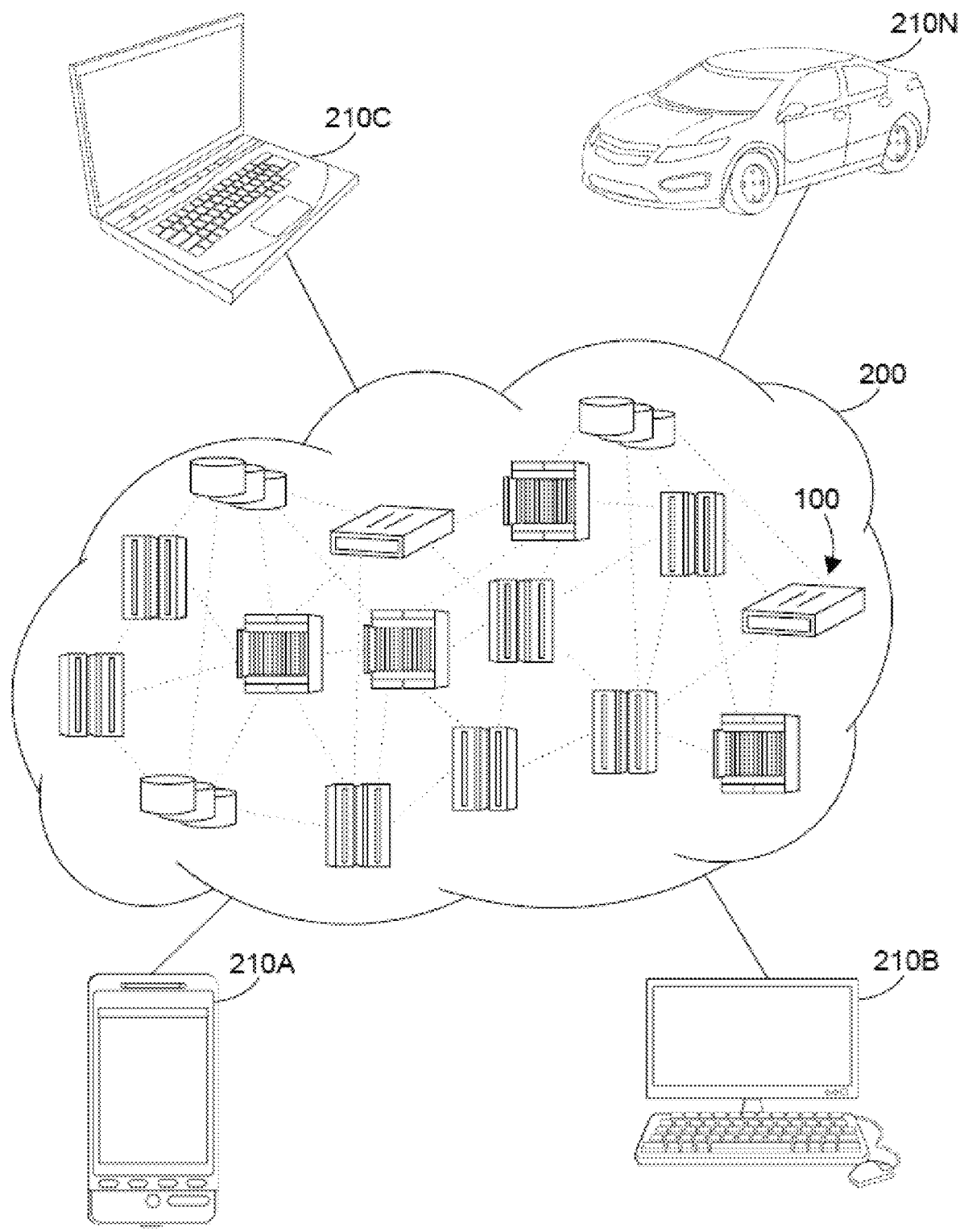
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
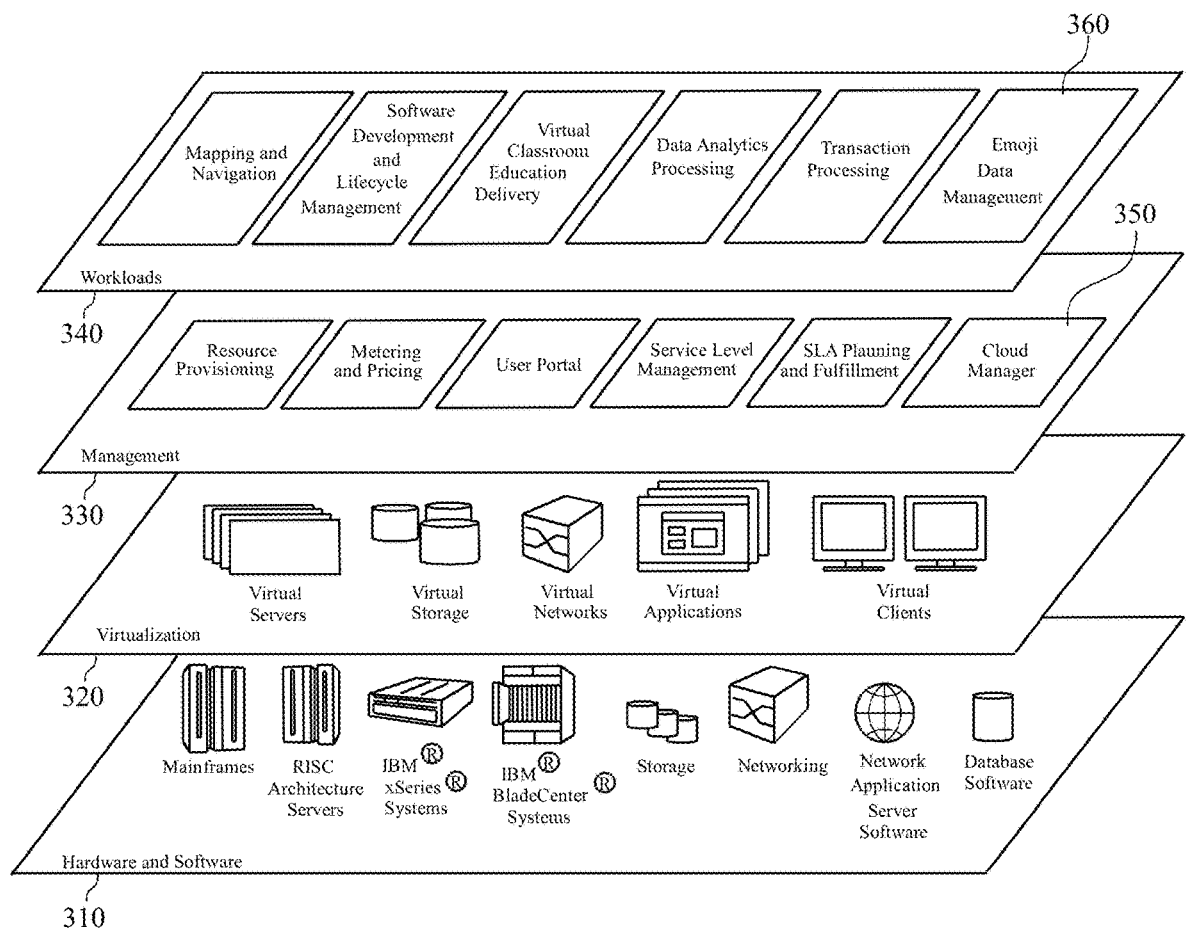
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and emoji data management 360, which may be utilized as discussed in more detail below.

Figure 4:
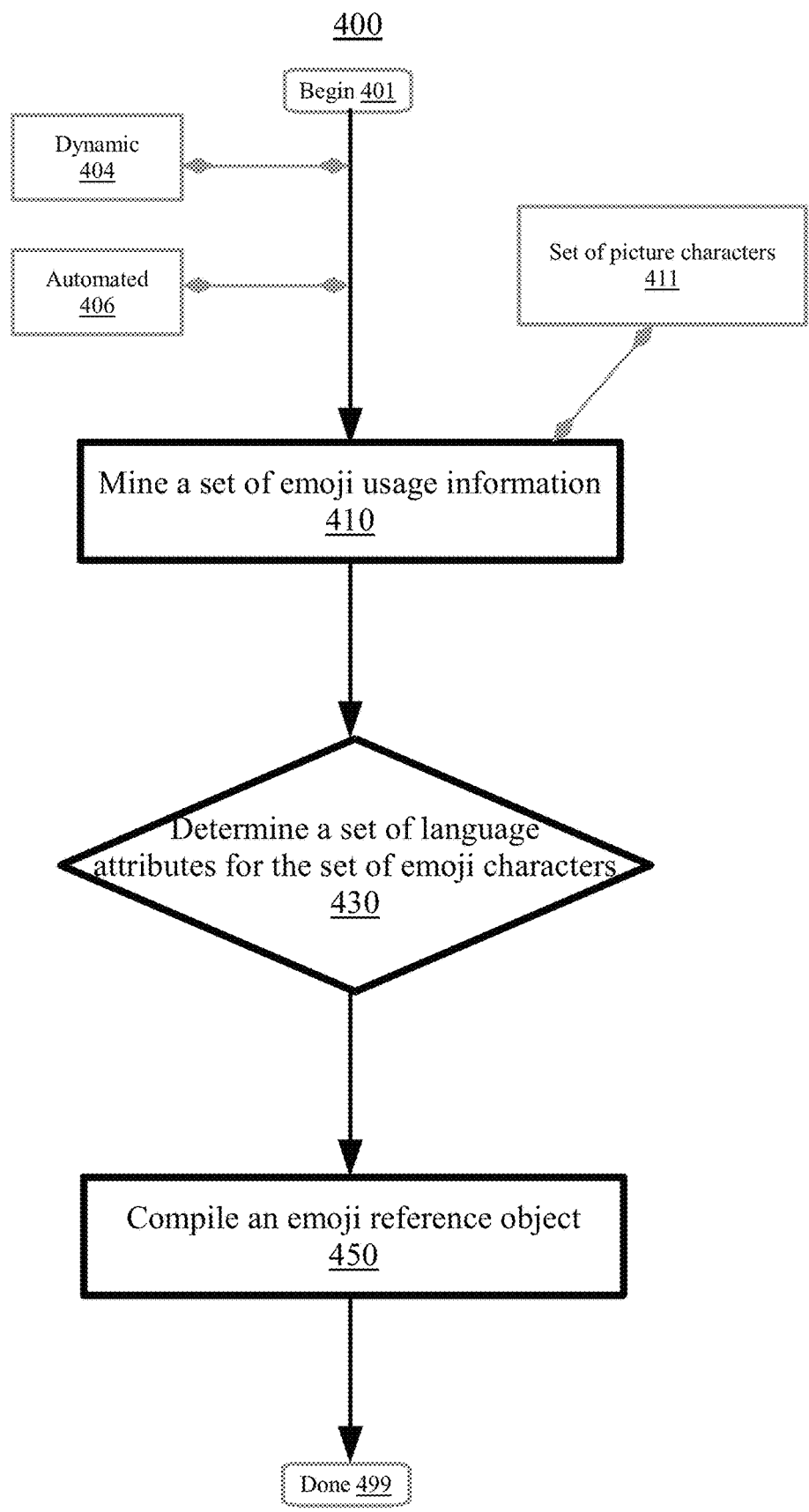
FIG. 4 is a flowchart illustrating a method for creating an emoji reference object with different language attributes with respect to emoji data management, according to embodiments.

FIG. 4 is a flowchart illustrating a method 400 for emoji data management. Aspects of FIG. 4 relate to compiling an emoji reference object using a set of language attributes determined based on a set of emoji usage information for a set of emoji characters. The set of emoji characters may include a collection of one or more pictographs or ideograms for representing facial expressions, objects, weather conditions, animals, or other concepts. As examples, the set of emoji characters my include happy/smiley faces, hearts, sad/crying faces, the sun, a dog, rain falling on an umbrella, a palm tree on a beach, or the like. Aspects of the disclosure relate to the recognition that, in some situations, the meaning of emoji may be ambiguous, or may convey different meanings to users of different cultural or linguistic backgrounds. Additionally, the use of emoji may pose challenges with respect to natural language processing services, as the presence of emoji may complicate text segmentation and filtering. Accordingly, aspects of the disclosure relate to building an emoji reference object to maintain language attributes (e.g., meaning, usage, nuances, context) for emoji characters with respect to one or more languages, cultures, locales, or user groups. The emoji reference object may be used to evaluate content that includes emojis (e.g., social media messages) to provide an interpretation of the meaning and context of the content. The emoji reference object may be used to facilitate flexibility and performance of natural language processing techniques and services. Leveraging use of an emoji reference object with respect to a set of emoji characters may facilitate communication clarity, accuracy, and efficiency. The method 400 may begin at block 401.

In embodiments, the mining, the determining, the compiling, and the other steps described herein may each be executed in a dynamic fashion at block 404. The steps described herein may be executed in a dynamic fashion to streamline emoji data management. For instance, the mining, the determining, the compiling, and the other steps described herein may occur in real-time, ongoing, or on-the-fly. As an example, one or more steps described herein may be performed on-the-fly (e.g., language attributes for emoji characters may be determined in real-time in response to mining a set of emoji usage information for the set of emoji characters) in order to streamline (e.g., facilitate, promote, enhance) emoji data management. Other methods of performing the steps described herein are also possible.

In embodiments, the mining, the determining, the compiling, and the other steps described herein may each be executed in an automated fashion at block 406. The steps described herein may be executed in an automated fashion without user intervention. In embodiments, the mining, the determining, the compiling, and the other steps described herein may be carried out by an internal emoji data management module maintained in a persistent storage device of a local computing device (e.g., network node). In embodiments, the mining, the determining, the compiling, and the other steps described herein may be carried out by an external emoji data management module hosted by a remote computing device or server (e.g., server accessible via a subscription, usage-based, or other service model). In this way, aspects of emoji data management may be performed using automated computing machinery without manual action. Other methods of performing the steps described herein are also possible.

At block 410, a set of emoji usage information may be mined. The mining may occur with respect to a set of emoji characters. Generally, mining can include collecting, gathering, surveying, aggregating, ingesting, importing, retrieving, extracting, or otherwise capturing the set of emoji usage information with respect to the set of emoji characters. The set of emoji characters may include a single emoji, a group of single unlinked emojis, multiple emojis strung together as a phrase, multiple emoji phrase strings, or other collections of emojis. As examples, the set of emoji characters may include a single emoji of a laughing face, or an emoji phrase including an emoji of a music note next to an emoji depicting a video camera to indicate a concept of a "music video." The set of emoji usage information may include data that characterizes the nature, context, environment, or other factors that describe how the set of emoji characters are used. As examples, the set of emoji information may include discussions or examples in which the set of emoji characters were used, metadata that indicates the time of day or date that the set of emoji characters was used, textual, image, video, or audio content associated with the set of emoji information, sentiment data for a portion of a communication in which the set of emoji characters was used, historical usage data for the set of emoji characters (e.g., by an individual user or by a group of users), apparent meanings/definitions for the set of emoji characters, or the like. In embodiments, mining the set of emoji usage information may include aggregating the set of usage information from user-generated content. For instance, mining may include utilizing a data scraping module to gather user-generated content from websites, social media, messaging platforms, emails, public forums, message boards, or other digital communication environments. In embodiments, the user-generated content gathered using the data scraping module may be analyzed using a content analysis tool (e.g., emoji management module) to extract the set of emoji usage information for the set of emoji characters. Other methods of mining the set of emoji usage information with respect to the set of emoji characters are also possible.

In embodiments, the set of emoji characters may be configured at block 411. The set of emoji characters may be configured to include a set of picture characters. The set of picture characters may correspond to a non-emotional-state feature. Generally, configuring the set of emoji characters may include organizing, forming, assembling, formatting, arranging, or otherwise structuring the set of emoji characters to include the set of picture characters which correspond to a non-emotional state feature. In embodiments, the set of picture characters may include a visual representation of an object, symbol, idea, or concept. In certain embodiments, as described herein, the set of picture characters may correspond to a non-emotional state feature. The non-emotional-state feature may include a depiction of an object, idea, or concept that does not explicitly convey or indicate a human emotion. As examples, the set of picture characters may include animals (e.g., dogs, cats, horses), food items (e.g., pizza, apples), automobiles (e.g., sports car, convertible, truck), naturally occurring objects or phenomena (e.g., trees, rocks, rain, snow, thunderstorms, volcanoes) or other ideographs that do not convey human emotions (e.g., smiley faces, sad/crying faces, laughing faces, angry faces). In embodiments, configuring the set of emoji characters may include filtering the set of emoji characters to keep the set of picture characters which correspond to a non-emotional state feature and remove those emoji characters that correspond to an emotional state feature. Other methods of configuring the set of emoji characters to include the set of picture characters are also possible.

At block 430, a set of language attributes for the set of emoji characters may be determined. The determining may occur based on the set of emoji usage information. Generally, determining can include computing, formulating, detecting, calculating, deriving, identifying, or otherwise ascertaining the set of language attributes for the set of emoji characters based on the set of emoji usage information. The set of language attributes may include linguistic elements, properties, traits, or other factors that characterize, typify, describe, contextualize, or define the set of emoji characters. As examples, the set of language attributes may include locales in which the set of emoji characters were used (e.g., countries, states, prefectures, provinces, districts), cultures in which the set of emoji characters were used (e.g., Western culture, Eastern Culture), semantics, meaning, definition, etymology, origin, synonyms, antonyms, or the like. In embodiments, determining the set of language attributes for the set of emoji characters may include analyzing the set of emoji usage information (e.g., discussions, examples, context) to ascertain the set of language attributes for the set of emoji characters. For instance, in embodiments, determining the set of language attributes may include utilizing an associative rule-based learning technique to identify relations between the context or sentiment indicated by the set of emoji usage information and the set of emoji characters (e.g., in order to derive the meaning, cultural context, etymology, or other language attributes). As an example, an associative rule-based learning technique may be used in conjunction with a natural language processing technique to parse a set of text data associated with an emoji, and it may be ascertained that a set of emoji characters depicting a charging bull is statistically correlated with sentiments of "anger, animosity, displeasure, indignation, exasperation." Accordingly, a meaning of "anger" be ascertained as a language attribute with respect to the set of emoji characters of a charging bull. Other methods of determining the set of language attributes for the set of emoji characters based on the set of emoji usage information are also possible.

At block 450, an emoji reference object may be compiled. The compiling may occur using the set of language attributes for the set of emoji characters. Generally, compiling can include creating, forming, generating, assembling, instantiating, structuring, or otherwise establishing the emoji reference object using the set of language attributes for the set of emoji characters. The emoji reference object may include a database, index, repository, or other lexical resource configured to maintain the set of emoji characters in association with the set of language attributes. As an example, the emoji reference object may include an emoji dictionary configured to provide information regarding the meaning, name, and related forms of the set of emoji characters, an emoji thesaurus to present synonyms and antonyms for the set of emoji characters, an emoji encyclopedia to provide the etymology, origin, cultural specific usages, or other information regarding the set of emoji characters, or other type of lexical resource. In embodiments, compiling the emoji reference object may include generating a series of data entries (e.g., within a database) for one or more particular emoji characters, and associating (e.g., linking, correlating, matching, mapping) the data entry for the set of emoji characters with one or more language attributes corresponding to the one or more particular emoji characters as determined based on the set of emoji usage information. As an example, in certain embodiments, compiling the emoji reference object may include creating a data entry for an emoji character depicting a rainy sky, and associating the rainy sky emoji character with a first language attribute of "Meaning1: Poor weather," a second language attribute of "Meaning2: Melancholy," and a third language attribute of "Name: Cloud with rain" (e.g., where the meanings are language attributes determined for the rainy sky emoji character based on the set of emoji usage information). Other methods of compiling the emoji reference object using the set of language attributes for the set of emoji characters are also possible.

Consider the following example. A set of emoji usage information with respect to an emoji depicting an alarm clock (e.g., [alarm clock]) may be mined from a collection of aggregated social media messages using a data scraping module. An associative rule-based learning technique may be used in conjunction with a natural language processing technique to ascertain the lexical context in which the alarm clock emoji is used in order to identify its meaning and other associated language attributes. As examples, the associative rule-based learning technique may analyze a set of social media messages of "Good morning! How did you sleep? [alarm clock]," "You don't have much time left . . . [alarm clock]" and "When are you going to be here? I've been waiting for an hour! [alarm clock]" to extract language attributes for the alarm clock emoji. For instance, in embodiments, a first language attribute of "Context1: Wake-up Greeting," a second language attribute of "Meaning1: Running out of time," and a third language attribute of "Meaning2: Impatience" may be extracted for the alarm clock emoji. As described herein, an emoji reference object may be compiled for the set of emoji characters. As an example, compiling the emoji reference object may include structuring an emoji database that includes a data entry for the alarm clock emoji, and linking the data entry for the alarm clock emoji with the first language attribute of "Context1: Wake-up Greeting," the second language attribute of "Meaning1: Running out of time," and the third language attribute of "Meaning2: Impatience." Other methods of emoji data management are also possible.

Method 400 concludes at block 499. Aspects of method 400 may provide performance or efficiency benefits for emoji data management. As an example, compiling an emoji reference object may facilitate expedient look-up of emoji meanings, usage contexts, origins, and other information to promote communication directness, transparency, and flexibility. Altogether, leveraging use of an emoji reference object with respect to a set of emoji characters may facilitate communication clarity, accuracy, and efficiency. Aspects may save resources such as bandwidth, disk, processing, or memory.

Figure 5:
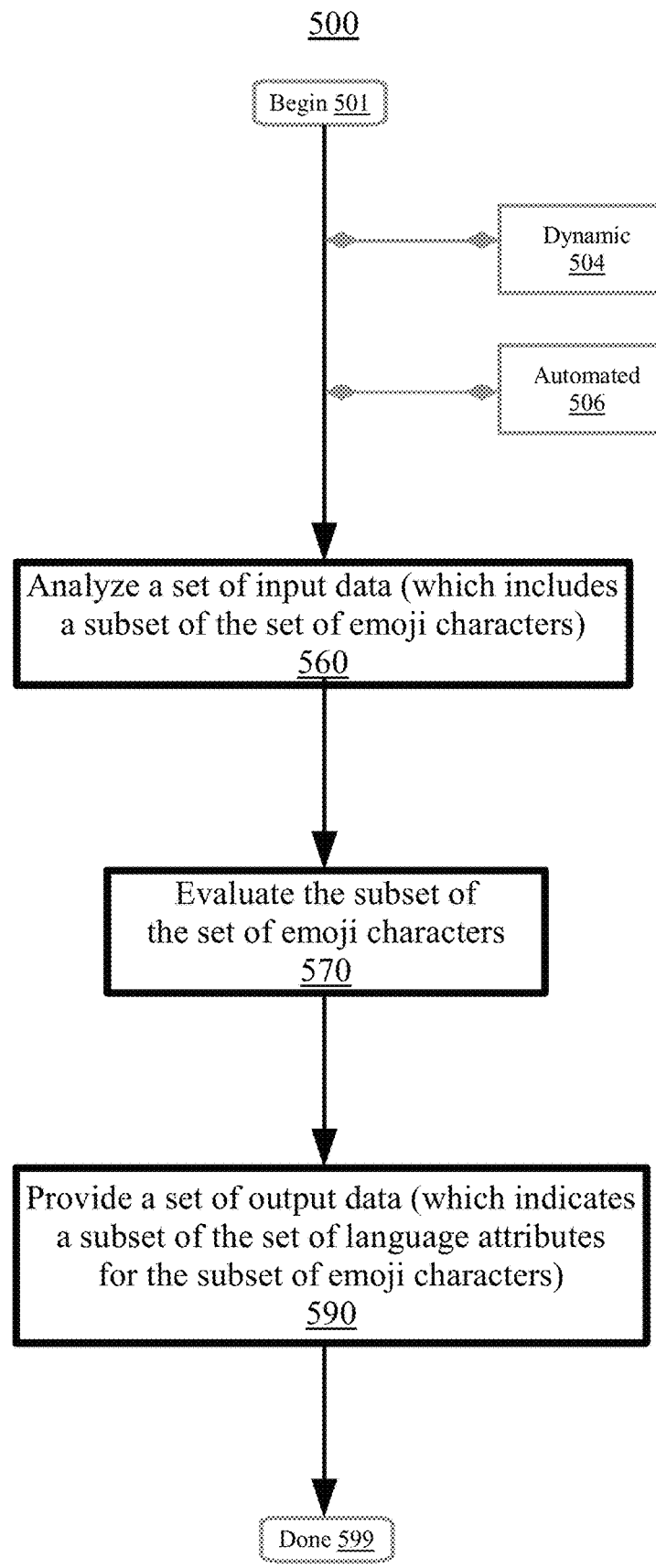
FIG. 5 is a flowchart illustrating a method for analyzing relationships between emoji characters and language attributes with respect to emoji data management, according to embodiments.

FIG. 5 is a flowchart illustrating a method 500 for emoji data management. Aspects of the method 500 relate to using the emoji reference object to evaluate a subset of emoji characters included in a set of input data, and providing a set of output data indicating a set of language attributes for the subset of emoji characters. In embodiments, aspects of method 500 may be similar or the same as aspects of method 400, as aspects may be utilized interchangeably with one or more methodologies described herein. Altogether, leveraging use of an emoji reference object with respect to a set of emoji characters may facilitate communication clarity, accuracy, and efficiency. The method 500 may begin at block 501.

In embodiments, the analyzing, the evaluating, the providing, and the other steps described herein may each be executed in a dynamic fashion at block 504. The steps described herein may be executed in a dynamic fashion to streamline emoji data management. For instance, the analyzing, the evaluating, the providing, and the other steps described herein may occur in real-time, ongoing, or on the fly. As an example, one or more steps described herein may be performed in real-time (e.g., input data including a subset of emoji characters may be evaluated in real-time to provide a set of output data indicating language attributes for the set of emoji characters) in order to streamline (e.g., facilitate, promote, enhance) emoji data management. Other methods of performing the steps described herein are also possible.

In embodiments, the analyzing, the evaluating, the providing, and the other steps described herein may each be executed in an automated fashion at block 506. The steps described herein may be executed in an automated fashion without user intervention. In embodiments, the analyzing, the evaluating, the providing, and the other steps described herein may be carried out by an internal emoji data management module maintained in a persistent storage device of a local computing device (e.g., network node). In embodiments, the analyzing, the evaluating, the providing, and the other steps described herein may be carried out by an external emoji data management module hosted by a remote computing device or server (e.g., server accessible via a subscription, usage-based, or other service model). In this way, aspects of emoji data management may be performed using automated computing machinery without manual action. Other methods of performing the steps described herein are also possible.

At block 560, a set of input data may be analyzed. The set of input data may include a subset of the set of emoji characters. The set of input data may include a collection of textual data, image data, video data, or other media content that includes a subset of the set of emoji characters. As examples, the set of input data may include a text message, email, social media message, blog post, forum/message board post, or other type of structured or unstructured data that includes (e.g., utilizes, incorporates, makes use of) a subset of the set of emoji characters. The subset of the set of emoji characters may include one or more emoji characters of the set of emoji characters. Generally, analyzing can include evaluating the content of the set of input data to determine one or more properties, attributes, or characteristics (e.g., number/type of emoji used) of the set of input data. Analyzing can include examining (e.g., performing an inspection of the set of input data), evaluating (e.g., generating an appraisal of the set of input data), resolving (e.g., ascertaining an observation/conclusion/answer with respect to the set of input data), parsing (e.g., deciphering structured and unstructured data constructs of the set of input data), querying (e.g., asking a question regarding the set of input data) or categorizing (e.g., organizing by a feature or element of the set of input data). In embodiments, analyzing the set of input data may include utilizing a natural language processing technique to parse the set of input data. The natural language processing technique may include one or more computer-based algorithms configured to derive meaning from natural language content. As examples, the natural language processing technique may include algorithms configured for part-of-speech tagging, parsing, relationship extraction, sentiment analysis, information retrieval, information extraction, morphological segmentation, and the like. In embodiments, analyzing the set of input data may include using the natural language processing technique to segment the set of input data (e.g., separate word boundaries, emoji), tag parts of speech, recognize named entities (e.g., proper nouns), extract relationships, interpret word/phrase meanings, and the like. Other methods of analyzing the set of input data are also possible.

At block 570, the subset of the set of emoji characters may be evaluated. The evaluating may occur using the emoji reference object. Generally, evaluating can include appraising, investigating, examining, inspecting, or otherwise assessing the subset of the set of emoji characters using the emoji reference object. In embodiments, evaluating the subset of the set of emoji characters may include utilizing the emoji reference object to ascertain a subset of the set of language attributes that correspond to the subset of the set of emoji characters. For instance, the emoji reference object may be used to identify semantic information, context-specific attributes, synonyms/antonyms, usage examples, and other data that characterizes the subset of the set of emoji characters. In embodiments, evaluating the subset of the set of emoji characters may include comparing the subset of the set of emoji characters with a set of emoji character data entries stored within the emoji reference object to identify a list of candidate emoji character definitions for the subset of the set of emoji characters. Consider the following example. A subset of the set of emoji characters may include an emoji phrase including an emoji depicting a user swimming, an emoji depicting a stopwatch, and an emoji depicting a trophy (e.g., [swimming][stopwatch][trophy]). As such, the emoji phrase may be compared with respect to the set of emoji character data entries stored in the emoji reference object, and it may be ascertained that the emoji combination [stopwatch][trophy] represents a known emoji compound associated with a definition of "new/winning record" that can be used as a suffix to indicate that a new record has been achieved with respect to an activity (e.g., sport, competition, event) indicated by a preceding emoji. Accordingly, the emoji phrase [swimming][stopwatch][trophy] may be ascertained to correspond to a definition of "new swimming record." Other methods of evaluating the set of emoji characters using the emoji reference object are also possible.

At block 590, a set of output data may be provided. The set of output data may indicate a subset of the set of language attributes for the subset of the set of emoji characters. Generally, providing can include displaying, conveying, relaying, transmitting, communicating, indicating, or otherwise presenting the set of output data which indicates the subset of the set of language attributes for the subset of the set of emoji characters. The set of output data may include a collection of information that indicates the results of the analysis and evaluation generated for the set of emoji characters using the emoji reference object. As described herein, the set of output data may indicate a subset of the set of language attributes that were identified as corresponding to the subset of emoji characters. For instance, the set of output data may include an interpretation of the set of input data that includes definitions, synonyms, context descriptions, and usage examples for the subset of emoji characters. In embodiments, providing the set of output data may include generating an annotated version of the set of input data, such that one or more emoji characters of the subset of emoji characters are marked with tags, flags, comments, or other descriptors that indicate associated language attributes, and subsequently presenting the set of output data to a user (e.g., on the screen of a user device). In embodiments, providing the set of output data may include generating a summary of the set of input data and transmitting the summary to a user (e.g., via email, text message). The summary may include an abbreviated, compressed, truncated, condensed, or abridged version of the set of input data that indicates the set of language attributes for the subset of the set of emoji characters. In embodiments, the set of output data may be provided to a user based on the manner in which the set of input data was received. For instance, a data submission method of the set of input data may be connected, and the set of output data may be formatted and provided to the user in the same manner as the data submission method (e.g., a user who submitted the set of input data using a smartphone messaging service may receive the set of output data using the smartphone messaging service). Other methods of providing the set of output data are also possible.

Consider the following example. A set of input data of a social media message which includes a subset of the set of emoji characters may be analyzed using a natural language processing technique. For instance, the set of input data may include an emoji phrase including an emoji depicting a house, an emoji depicting an arrow pointing to the right, and an emoji depicting a bag of money (e.g., [house][right-arrow][moneybag]). As described herein, the natural language processing technique may be used to analyze the set of input data, segment the words and emoji, and ascertain information regarding the usage context of the set of emoji characters. In embodiments, the subset of the set of emoji characters may be evaluated with respect to a set of emoji character data entries stored in the emoji reference object, and it may be ascertained that the emoji combination [right-arrow][moneybag] represents a known emoji compound associated with a definition of "to sell" that may be used as a suffix to indicate that an object indicated by a preceding emoji character has been sold. Accordingly, based on the set of emoji character data entries stored in the emoji reference object, it may be ascertained that the emoji phrase [house][right-arrow][moneybag] corresponds to a definition of "I sold my house." As described herein, a set of output data which indicates a subset of the set of language attributes for the subset of emoji characters may be provided. For instance, in embodiments, a set of output data may be generated in which the emoji phrase [house][right-arrow][moneybag] is replaced by the text "I sold my house." In certain embodiments, the set of output data may include an annotated version of the social media message in which the emoji phrase [house] [right-arrow][moneybag] is tagged with a textual description that defines the emoji phrase and displays other language attributes regarding the emoji phrase (e.g., how long the emoji phrase has been in circulation, other interpretations). As such, the set of output data may be provided to a user (e.g., recipient of the social media message). Other methods of utilizing the emoji reference object for emoji data management are also possible.

Method 500 concludes at block 599. Aspects of method 500 may provide performance or efficiency benefits for emoji data management. Aspects may save resources such as bandwidth, disk, processing, or memory.

Figure 6:
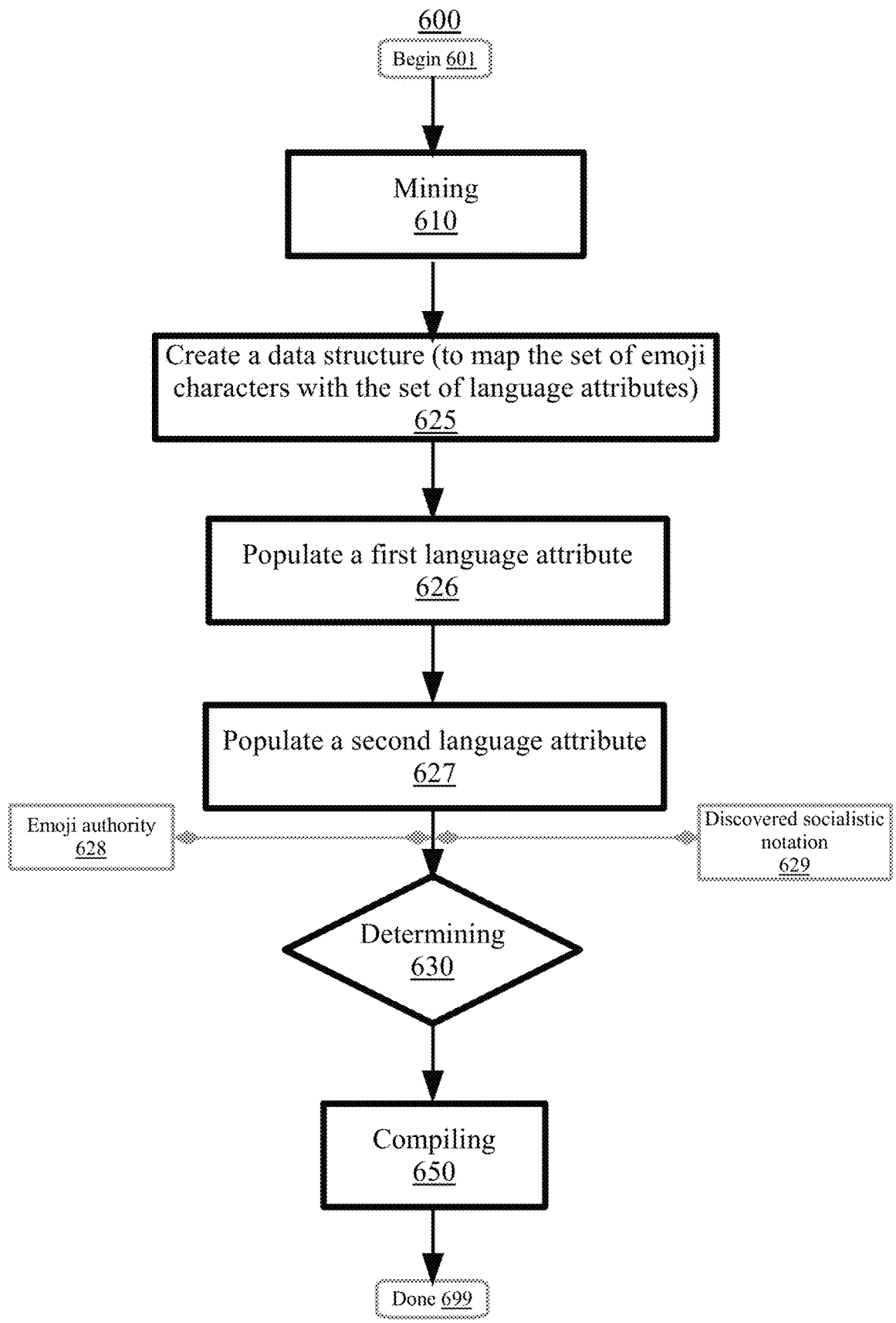
FIG. 6 is a flowchart illustrating a method for defining an emoji-language data structure with respect to emoji data management, according to embodiments.

FIG. 6 is a flowchart illustrating a method 600 for emoji data management. Aspects of the method 600 relate to creating a data structure to map emoji characters with corresponding language attributes. In embodiments, aspects of method 600 may be similar or the same as aspects of method 400/500, as aspects may be utilized interchangeably with one or more methodologies described herein. Altogether, leveraging use of an emoji reference object with respect to a set of emoji characters may facilitate communication clarity, accuracy, and efficiency. The method 600 may begin at block 601. At block 610, a set of emoji usage information may be mined. The mining may occur with respect to a set of emoji characters.

At block 625, a data structure may be created. The creating may occur to map the set of emoji characters with the set of language attributes. Generally, creating can include building, assembling, generating, organizing, arranging, structuring, or otherwise establishing the data structure. The data structure may include a digital object for organizing data to facilitate search and retrieval. As examples, the data structure may include a table, array, linked list, record, union, tagged union, class, index, or the like. As described herein, the data structure may be created to map the set of emoji characters with the set of language attributes. For instance, the data structure may maintain data entries for individual emoji characters of the set of emoji characters in association with corresponding language attributes. In embodiments, creating the data structure may include generating a data entry (e.g., within a table, database, index, or array) for a particular emoji character, and associating the particular emoji character with one or more other data entries that include corresponding language attributes. As an example, an emoji depicting a pill (e.g., [pill]) may be associated with a first language attribute of "Meaning1: Medicine," a second language attribute of "Meaning 2: Vitamins," and a third language attribute of "Example1: When I have a headache, I take a [pill] to feel better." Other methods of creating the data structure to map the set of emoji characters with the set of language attributes are also possible.

At block 626, a first language attribute may be populated. The populating may occur using a first emoji information source. The first language attribute may correspond with a particular emoji in a particular record of the data structure. Generally, populating can include inserting, supplying, including, embedding, introducing, entering, or otherwise instantiating the first language attribute in a particular record (e.g., data entry, column, row, data cell) of the data structure. As described herein, the first language attribute may be populated using a first emoji information source. In embodiments, the first emoji information source may include a point of origin, reference, or evidence that includes the first language attribute. As an example, the first emoji information source may include a list of emoji characters and a plurality of synonyms (e.g., first language attribute) for each emoji character. In embodiments, populating the data structure with the first language attribute may include searching the data structure (e.g., emoji reference object) for a particular record of the data structure that includes an emoji character referenced by the first emoji information source, and storing the first language attribute in association with (e.g., within the particular record, in a linked record, in the same table as the particular record) the particular emoji. As an example, consider a first emoji information source that defines synonyms of [wristwatch], [hourglass], and [alarmclock] for an emoji of [clock]. Accordingly, the data structure may be searched for a particular record that includes the emoji of [clock], and the synonyms of [wristwatch], [hourglass], and [alarmclock] may be saved in association with the particular record. Other methods of populating the data source using the first language attribute are also possible.

At block 627, a second language attribute may be populated. The populating may occur using a second emoji information source. The second language attribute may correspond with the particular emoji in the particular record of the data structure. Generally, populating can include inserting, supplying, including, embedding, introducing, entering, or otherwise instantiating the second language attribute in a particular record (e.g., data entry, column, row, data cell) of the data structure. As described herein, the second language attribute may be populated using a second emoji information source. In embodiments, the second emoji information source may include a point of origin, reference, or evidence that includes the second language attribute. As an example, the second emoji information source may include a social media message that implicitly or explicitly indicates a second language attribute for the particular emoji. In embodiments, populating the data structure with the second language attribute may include searching the data structure (e.g., emoji reference object) for a particular record of the data structure that includes an emoji character referenced by the second emoji information source, and storing the second language attribute in association with (e.g., within the particular record, in a linked record, in the same table as the particular record) the particular emoji. As an example, consider a second emoji information source that includes an example usage case of "If I don't hurry, I won't make it to work on [clock]" (e.g., where the clock emoji is used to indicate "time.") Accordingly, the data structure may be searched for a particular record that includes the emoji of [clock], and the example usage case of "If I don't hurry, I won't make it to work on [clock]" may be saved in association with the particular record. Other methods of populating the data source using the second language attribute are also possible.

In embodiments, it may be ascertained that the first emoji information source includes an emoji authority at block 628. Generally, ascertaining can include computing, resolving, detecting, sensing, identifying, or otherwise determining that the first emoji information source includes the emoji authority. The emoji authority may include an official, accredited, certified, or conclusive source of language attribute information for the set of emoji characters. As examples, the emoji authority may include a list of Unicode definitions, emoji repositories, common locale data repositories (CLDR), international components for Unicode (ICU), input method vendors, social media vendors, or the like. In embodiments, ascertaining that the first emoji information source includes an emoji authority may include performing an authentication operation on the first emoji information source to verify that the first emoji information source achieves an authenticity criterion (e.g., credentials for the first emoji information source match those of a social media vendor, emoji repository, or the like). Other methods of ascertaining that the first emoji information source includes the emoji authority are also possible.

In embodiments, a discovered socialistic notation may occur at block 629. It may be ascertained that the second emoji information source includes a discovered socialistic notation. Generally, ascertaining can include computing, resolving, detecting, sensing, identifying, or otherwise determining that the second emoji information source includes the discovered socialistic notation. The discovered socialistic notation may include a collection of language attributes for the set of emoji characters that is gathered from user-generated content. As examples, the discovered socialistic notation may include uses of emoji characters and phrases on public forums, message boards, social media, user profiles, and the like. In embodiments, ascertaining that the second emoji information source includes a discovered socialistic notation may include performing an authentica-tion operation on the second emoji information source to ascertain whether the second emoji information source achieves an authenticity criterion (e.g., credentials for the second emoji information source match those of a social media vendor, emoji repository, or the like), and determining that the second emoji information source fails to achieve the authenticity criterion. Other methods of ascertaining that the second emoji information source includes the discovered socialistic notation are also possible.

At block 630, a set of language attributes for the set of emoji characters may be determined. The determining may occur based on the set of emoji usage information. At block 650, an emoji reference object may be compiled. The compiling may occur using the set of language attributes for the set of emoji characters. Method 600 concludes at block 699. Aspects of method 600 may provide performance or efficiency benefits for emoji data management. Aspects may save resources such as bandwidth, disk, processing, or memory.

Figure 7:
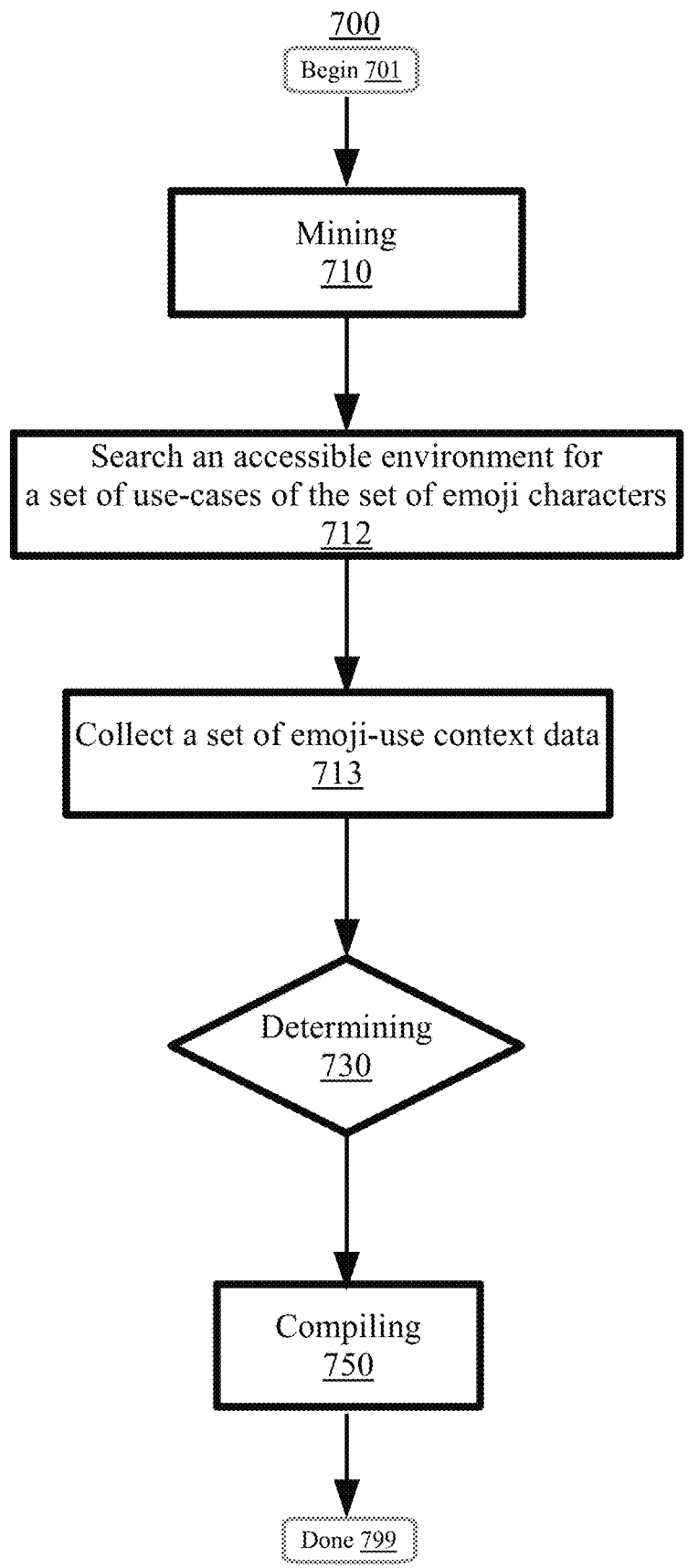
FIG. 7 is a flowchart illustrating a method for collecting emoji data from accessible source with respect to emoji data management, according to embodiments.

FIG. 7 is a flowchart illustrating a method 700 for emoji data management. Aspects of method 700 relate to searching an accessible environment for a set of use-cases of a set of emoji characters, and collecting a set of emoji-use context data from the accessible environment. In embodiments, aspects of method 700 may be similar or the same as aspects of method 400/500/600, as aspects may be utilized interchangeably with one or more methodologies described herein. Altogether, leveraging use of an emoji reference object with respect to a set of emoji characters may facilitate communication clarity, accuracy, and efficiency. The method 700 may begin at block 701. At block 710, a set of emoji usage information may be mined. The mining may occur with respect to a set of emoji characters.

At block 712, an accessible environment may be searched. The accessible environment may be searched for a set of use-cases of the set of emoji characters. Generally, searching can include seeking, inspecting, inquiring, investigating, or otherwise examining the accessible environment for the set of use-cases of the set of emoji characters. The accessible environment may include the public domain, social media, public forum, and other openly-available sources of information. As an example, the accessible environment may include a public message board thread in which posts and replies from a plurality of users are organized by post order. In embodiments, the accessible environment may be searched for a set of use-cases of the set of emoji characters. The set of use-cases of the set of emoji characters may include examples or utilization instances in which one or more of the set of emoji characters are used. As an example, the set of use-cases may include a post in the public message board thread of "Oh no, I think I lost my wallet! [shocked-face]" (e.g., a use-case of the [shocked-face] emoji character). In embodiments, searching may include utilizing a code analysis tool to parse a set of Unicode content of the accessible environment, and identifying a set of character encodings that correspond to one or more emoji characters of the set of emoji characters. In response to identifying the set of character encodings, the code analysis tool may be configured to mark each identified character encoding as a use-case of the set of emoji characters. Other methods of searching the accessible environment for the set of use-cases of the set of emoji characters are also possible.

At block 713, a set of emoji-use context data may be collected. The set of emoji-use context data may be collected from the accessible environment. The set of emoji-use context data may correspond with the set of use-cases of the set of emoji characters. In embodiments, aspects of the disclosure relate to the recognition that the context in which an emoji character is used may affect its meaning, how it is used, or the nuances it implies. Generally, collecting can include acquiring, gathering, obtaining, amassing, assembling, compiling, capturing, accumulating, or otherwise aggregating the set of emoji-use context data. The set of emoji-use context data may include information that characterizes the background setting, facts, and circumstances in which a particular use-case of an emoji character occurred. For instance, the set of emoji-use context data may include dialogue or discussion that establishes the context in which a particular emoji is to be interpreted. In embodiments, collecting the set of emoji-use context data may include utilizing a natural language processing technique to parse the textual data in which a particular emoji character is used (e.g., embedded, inserted) to extract a semantic feature that defines the topic or subject matter of the discussion as well as a sentiment factor that indicates an emotion or attitude with respect to the topic. In embodiments, the particular emoji character may be tagged with a tag, flag, or other identifier based on the extracted semantic factor and sentiment factor to indicate the emoji-use context data for the particular emoji character. Consider the following example. An emoji depicting a fish (e.g., [fish]) may be used in a social media message of "I don't know that I believe you about that . . . [fish]." As described herein, the natural language processing technique may parse the semantic content of the social media message, and ascertain that the topic of the message is "belief" (e.g., indicated by semantic feature of "believe") and that the sentiment factor for the message is one of "skepticism" (e.g., indicated by the sentiment factor of "I don't know . . . "). Accordingly, the emoji character of [fish] may be tagged with a set of emoji-use context data that indicates that the meaning of the [fish] emoji character in this context is to indicate skepticism or disbelief (e.g., the claim of a first user appears "fishy" to a second user). Other methods of collecting the set of emoji-use context data from the accessible environment are also possible.

At block 730, a set of language attributes for the set of emoji characters may be determined. The determining may occur based on the set of emoji usage information. At block 750, an emoji reference object may be compiled. The compiling may occur using the set of language attributes for the set of emoji characters. Method 700 concludes at block 799. Aspects of method 700 may provide performance or efficiency benefits for emoji data management. Aspects may save resources such as bandwidth, disk, processing, or memory.

Figure 8:
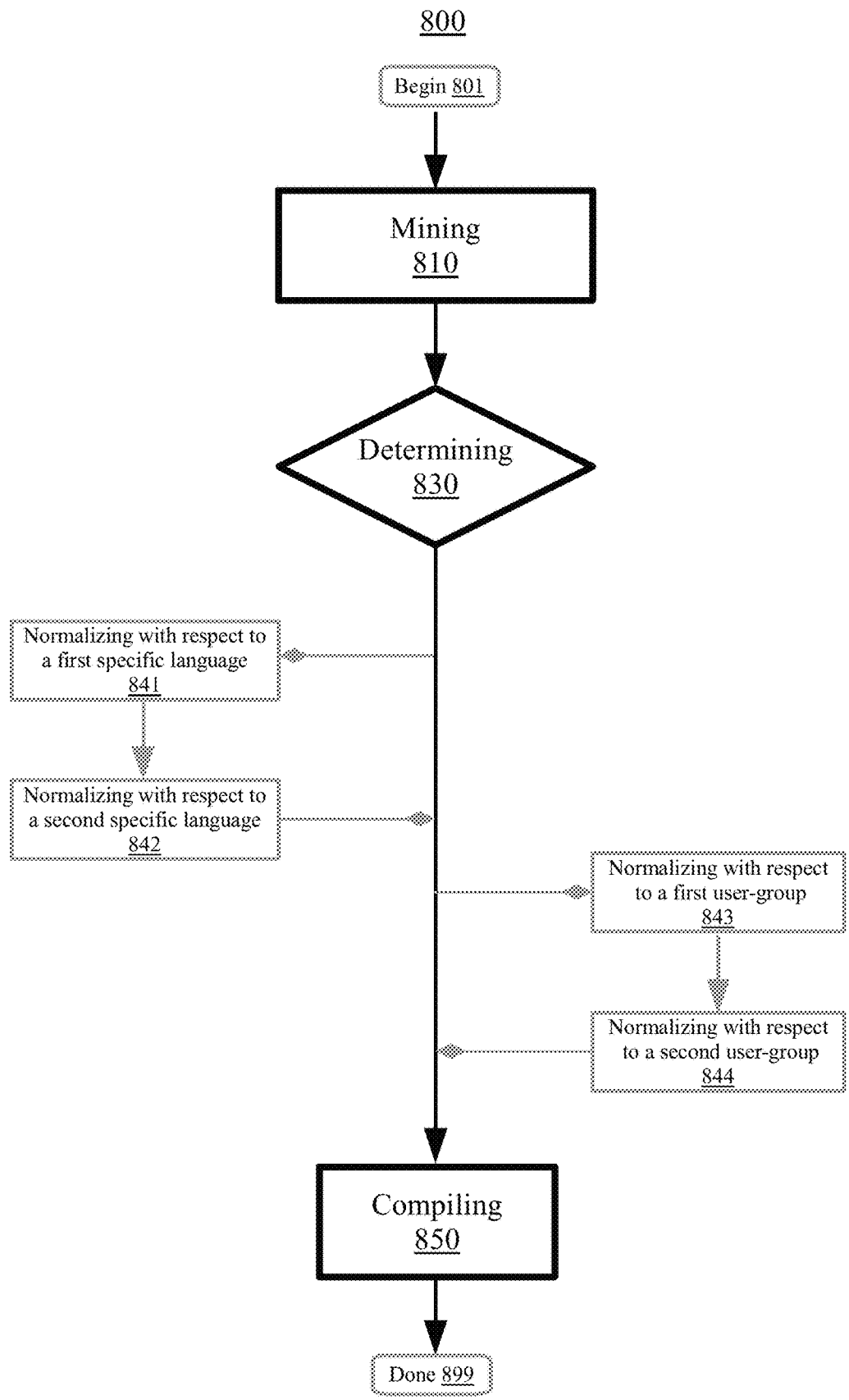
FIG. 8 is a flowchart illustrating a method for normalizing collected emoji characters with respect to emoji data management, according to embodiments.

FIG. 8 is a flowchart illustrating a method 800 for emoji data management. Aspects of the disclosure relate to the recognition that, in some situations, emoji characters may have different meanings, nuances, and usage patterns depending on the language or user-group context in which they are used. Accordingly, aspects of the method 800 relate to normalizing a relationship between the set of the emoji characters and the set of language attributes based on a specific language or user-group. In embodiments, aspects of method 800 may be similar or the same as other aspects, as aspects may be utilized interchangeably with one or more methodologies described herein. Altogether, leveraging use of an emoji reference object with respect to a set of emoji characters may facilitate communication clarity, accuracy, and efficiency. The method 800 may begin at block 801. At block 810, a set of emoji usage information may be mined. The mining may occur with respect to a set of emoji characters. At block 830, a set of language attributes for the set of emoji characters may be determined. The determining may occur based on the set of emoji usage information.

In embodiments, a first relationship of the set of emoji characters and the set of language attributes may be normalized at block 841. The normalizing may occur with respect to a first specific language. The first relationship may include a respective emoji of the set of emoji characters and a first respective language attribute of the set of language attributes. Generally, normalizing can include standardizing, assimilating, classifying, categorizing, homogenizing, or otherwise generalizing the first relationship of the set of emoji characters and the set of language attributes with respect to the first specific language. The first specific language may include a body of words together with the linguistic systems (e.g., grammar) that define their use (e.g., Japanese, Spanish, French, German, Russian). The first relationship may include a link, connection, or association between one or more emoji characters of the set of emoji characters and one or more language attributes of the set of language attributes (e.g., meaning, usage example). For example, the first relationship may include a correspondence between an emoji character depicting a hammer and a wrench (e.g., [hammer&wrench]) and a language attribute of "Meaning1: Repair." As described herein, aspects of the disclosure relate to the recognition that, in some situations, particular emoji characters may have different meanings in different languages. Accordingly, in embodiments, normalizing may include establishing a language-specific relationship between a respective emoji character and a respective language attribute (e.g., to indicate that the respective language attribute is only valid for the respective emoji character in a particular language). As an example, consider an emoji character depicting a woman with her arms crossed in an "X" shape in front of her (e.g., [crossed-arms]). In embodiments, normalizing the first relationship may include establishing a language-specific relationship between the [crossed-arms] emoji character and a language attribute of "Meaning1: Do not Enter" with respect to a first specific language of "Korean." Other methods of normalizing the first relationship of the set of emoji characters and the set of language attributes are also possible.

In embodiments, a second relationship of the set of emoji characters and the set of language attributes may be normalized at block 842. The normalizing may occur with respect to a second specific language. The second relationship may include the respective emoji of the set of emoji characters and a second respective language attribute of the set of language attributes. Generally, normalizing can include standardizing, assimilating, classifying, categorizing, homogenizing, or otherwise generalizing the second relationship of the set of emoji characters and the set of language attributes with respect to the second specific language. The second specific language may include a body of words together with the linguistic systems (e.g., grammar) that define their use (e.g., Japanese, Spanish, French, German, Russian). The second relationship may include a link, connection, or association between one or more emoji characters of the set of emoji characters and one or more language attributes of the set of language attributes (e.g., meaning, usage example). For example, the second relationship may include a correspondence between an emoji character depicting a hospital (e.g., [hospital]) and a language attribute of "Meaning1: Health Care." As described herein, aspects of the disclosure relate to the recognition that, in some situations, particular emoji characters may have different meanings in different languages. Accordingly, in embodiments, normalizing may include establishing a language-specific relationship between a respective emoji character and a respective language attribute (e.g., to indicate that the respective language attribute is only valid for the respective emoji character in a particular language). As an example, once again consider an emoji character depicting a woman with her arms crossed in an "X" shape in front of her (e.g., [crossed-arms]). In embodiments, normalizing the second relationship may include establishing a language-specific relationship between the [crossed-arms] emoji character and a language attribute of "Meaning1: Don't bother me" with respect to a second specific language of "Chinese." In certain embodiments, normalizing may include generalizing the first and the second relationships to generate a shared language attribute that applies with respect to both the first specific language and the second specific language. As an example, with respect to a first language attribute of "Meaning1: Do not Enter" and a second language attribute of "Don't bother me," the first and the second relationships may be generalized to create a shared language attribute of "Denial" that applies with respect to both the first and second specific languages (e.g., Korean and Chinese). Other methods of normalizing the second relationship of the set of emoji characters and the set of language attributes are also possible.

In embodiments, a first relationship of the set of emoji characters and the set of language attributes may be normalized at block 843. The normalizing may occur with respect to a first-user group. The first relationship may include a respective emoji of the set of emoji characters and a first respective language attribute of the set of language attributes. Generally, normalizing can include standardizing, assimilating, classifying, categorizing, homogenizing, or otherwise generalizing the first relationship of the set of emoji characters and the set of language attributes with respect to the first user group. The first user group may include a number of individuals who share a common language, nationality, ethnicity, geographical area, cultural background, or other attributes (e.g., Hispanic user group). The first relationship may include a link, connection, or association between one or more emoji characters of the set of emoji characters and one or more language attributes of the set of language attributes. For example, the first relationship may include a correspondence between an emoji character depicting a fork and knife (e.g., [fork&knife]) and a language attribute of "Meaning1: Dinner." As described herein, aspects of the disclosure relate to the recognition that, in some situations, particular emoji characters may have different meanings for individuals of different user groups. Accordingly, in embodiments, normalizing may include establishing a user-group specific relationship between a respective emoji character and a respective language attribute (e.g., to indicate that the respective language attribute is only valid for the respective emoji character for individuals of a particular user-group). As an example, consider an emoji character depicting folded hands (e.g., [folded-hands]). In embodiments, normalizing the first relationship may include establishing a user-group-specific relationship between the [folded-hands] emoji character and a language attribute of "Meaning1: Please and Thank You" with respect to a first user-group of "Japanese Culture." Other methods of normalizing the first relationship of the set of emoji characters and the set of language attributes are also possible.

In embodiments, a second relationship of the set of emoji characters and the set of language attributes may be normalized at block 844. The normalizing may occur with respect to a second user-group. The second relationship may include the respective emoji of the set of emoji characters and a second respective language attribute of the set of language attributes. Generally, normalizing can include standardizing, assimilating, classifying, categorizing, homogenizing, or otherwise generalizing the second relationship of the set of emoji characters and the set of language attributes with respect to the second user group. The second user group may include a number of individuals who share a common language, nationality, ethnicity, geographical area, cultural background, or other attributes (e.g., Scandinavian user group). In embodiments, the second user group may include individuals who belong to the same age group (e.g., 0-12, 13-17, 18-25, 26-35, 36-45, 46+) The second relationship may include a link, connection, or association between one or more emoji characters of the set of emoji characters and one or more language attributes of the set of language attributes. For example, the second relationship may include a correspondence between an emoji character depicting a dumbbell (e.g., [dumbbell]) and a language attribute of "Meaning1: Weight-Lifting." As described herein, aspects of the disclosure relate to the recognition that, in some situations, particular emoji characters may have different meanings for individuals of different user groups. Accordingly, in embodiments, normalizing may include establishing a user-group specific relationship between a respective emoji character and a respective language attribute (e.g., to indicate that the respective language attribute is only valid for the respective emoji character for individuals of a particular user-group). As an example, consider an emoji character depicting folded hands (e.g., [folded-hands]). In embodiments, normalizing the second relationship may include establishing a user-group-specific relationship between the [folded-hands] emoji character and a language attribute of "Meaning1: To Pray" with respect to a first user-group of "Occidentals." Other methods of normalizing the second relationship of the set of emoji characters and the set of language attributes are also possible.

At block 850, an emoji reference object may be compiled. The compiling may occur using the set of language attributes for the set of emoji characters. Method 800 concludes at block 899. Altogether, leveraging use of an emoji reference object with respect to a set of emoji characters may facilitate communication clarity, accuracy, and efficiency. Aspects of method 800 may provide performance or efficiency benefits for emoji data management. Aspects may save resources such as bandwidth, disk, processing, or memory.

Figure 9:
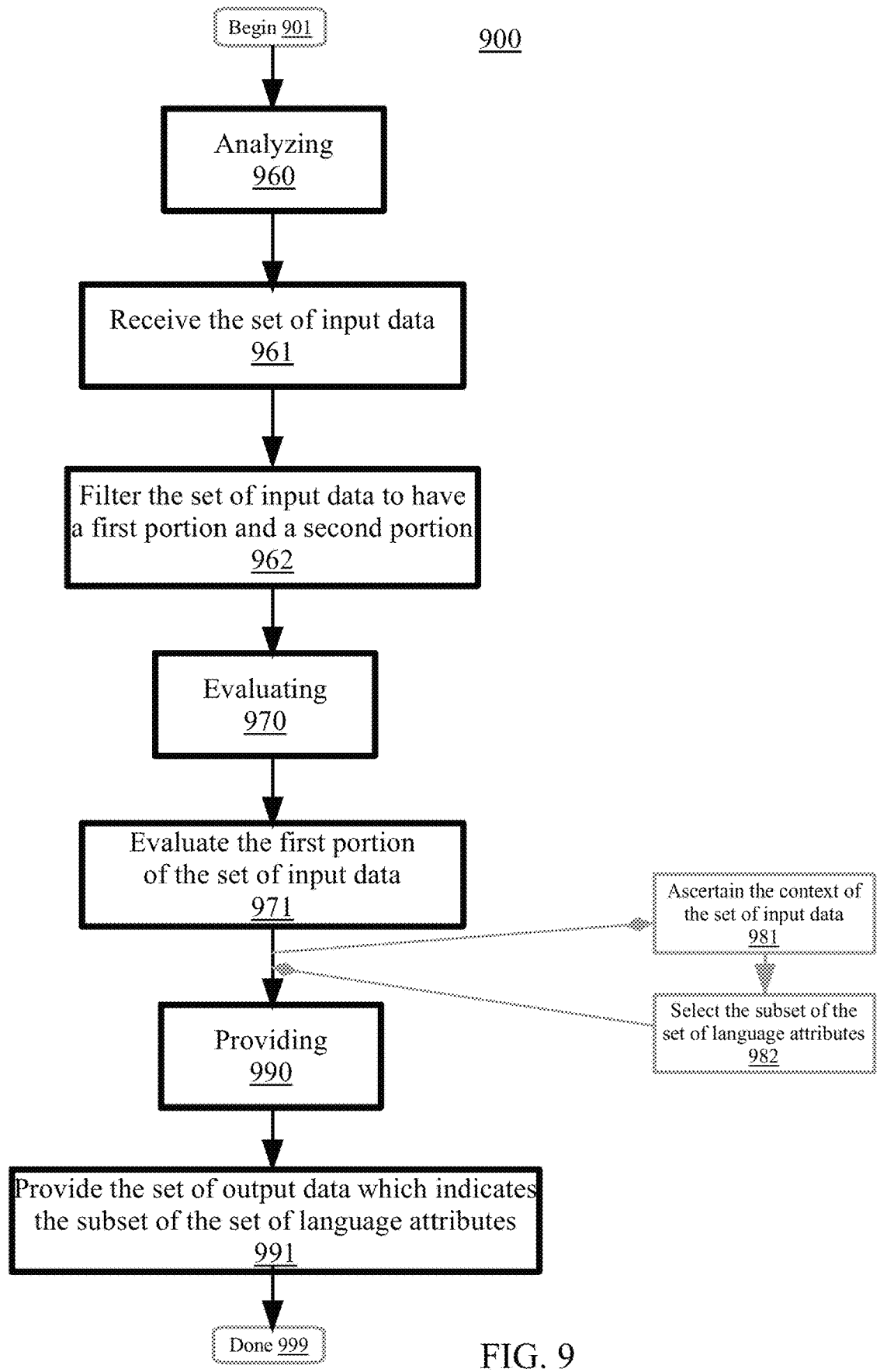
FIG. 9 is a flowchart illustrating a method for filtering input data and getting emoji portions for evaluation with respect to emoji data management, according to embodiments.

FIG. 9 is a flowchart illustrating a method 900 for emoji data management. Aspects of the method 900 relate to evaluating portions of the set of input data and providing a set of output data to indicate a subset of the set of language attributes for a subset of emoji characters. In embodiments, aspects of method 900 may be similar or the same as other aspects, as aspects may be utilized interchangeably with one or more methodologies described herein. Altogether, leveraging use of an emoji reference object with respect to a set of emoji characters may facilitate communication clarity, accuracy, and efficiency. The method 900 may begin at block 901. At block 960, a set of input data may be analyzed. The set of input data may include a subset of the set of emoji characters.

At block 961, the set of input data may be received. Generally, receiving can include detecting, collecting, sensing, discovering, creating, recognizing, generating, obtaining, or otherwise accepting delivery of the set of input data. As described herein, the set of input data may include a collection of textual data, image data, video data, or other media content that includes a subset of the set of emoji characters. As examples, the set of input data may include a text message, email, social media message, blog post, forum/message board post, or other type of structured or unstructured data that includes (e.g., utilizes, incorporates, makes use of) a subset of the set of emoji characters. In embodiments, receiving the set of input data may include collecting a submission of the set of input data from a user (e.g., the user has submitted the set of input data for analysis and evaluation). In certain embodiments, receiving the set of input data may include detecting that a set of user preferences for a user (e.g., from a user profile) indicate that the set of input data is to be automatically gathered and processed, and subsequently importing the set of input data for analysis. In embodiments, the set of input data may be filtered at block 962. The set of input data may be filtered to have a first portion of the set of input data and a second portion of the set of input data. Generally, filtering can include refining, sorting, cataloguing, categorizing, sorting, classifying, organizing, separating, revising, or otherwise arranging the set of input data to have the first portion and the second portion. In embodiments, the first portion of the set of input data may include a segment, part, excerpt, or division of the set of input data that includes a set of natural language elements. The set of natural language elements may include textual content such as letters, words, characters, special characters, and other linguistic aspects. The second portion of the set of input data may include a segment, part, excerpt, or division of the set of input data that includes the subset of the set of emoji characters. In embodiments, filtering the first portion of the set of input data and the second portion of the set of input data may include examining the set of input data to identify the set of natural language elements and the subset of the set of emoji characters, and subsequently separating the set of natural language elements into the first portion of the set of input data and the subset of the set of emoji characters into the second portion of the set of input data. For instance, in embodiments, a code analysis tool may be used to parse a set of Unicode content of the set of input data and identify a set of character encodings that correspond to the subset of the set of emoji characters. Accordingly, the subset of the set of emoji characters identified using the code analysis tool may be compiled (e.g., stored, saved) as the second set of input data, and the set of natural language elements may be isolated and saved as the first set of input data. Other methods of receiving the set of input data and filtering the set of input data are also possible.

At block 970, the subset of the set of emoji characters may be evaluated. The evaluating may occur using the emoji reference object. At block 971, the first portion of the set of input data may be evaluated. The evaluating may occur using a natural language processing technique. Generally, evaluating can include appraising, investigating, examining, inspecting, or otherwise assessing the first portion of the set of input data using the natural language processing technique. In embodiments, evaluating the first portion of the set of input data may include utilizing the natural language processing technique to parse the set of natural language elements included in the first portion of the set of input data to tag parts of speech, recognize named entities (e.g., proper nouns), extract relationships, interpret word/phrase meanings, and perform other tasks to derive meaning from the first portion of the set of input data. For instance, evaluating the first portion of the set of input data may include comparing the set of natural language elements (e.g., words and phrases) with a sentiment classification map to ascertain the sentimental polarity of the set of input data. As an example, a phrase of "I can't wait until the trip this weekend!!" may be compared with the sentimental classification map and a sentimental polarity of "excitement, enthusiasm" may be ascertained for the first portion of the set of input data. Other methods of analyzing the first portion of the set of input data using the natural language processing technique are also possible.

In embodiments, the context of the set of input data may be ascertained at block 981. The ascertaining may occur based on evaluating the first portion of the set of input data using the natural language processing technique. Aspects of the disclosure relate to the recognition that, in certain situations, a particular emoji may have a plurality of potential meanings that differ depending on the context of the set of input data. Accordingly, aspects of the disclosure relate to ascertaining the context of the set of input data to facilitate selection of a subset of language attributes for a subset of emoji characters. Generally, ascertaining can include computing, resolving, detecting, calculating, deriving, identifying, or otherwise determining the context of the set of input data. As described herein, the context may include information that characterizes the background setting, facts, and circumstances in which a particular use-case of an emoji character occurred. For instance, the context may include a dialogue or discussion that establishes a topic, subject matter, or theme with respect to which an emoji character is used. In embodiments, ascertaining the context of the set of input data may include analyzing metadata (e.g., time and date associated with the set of input data), historical data (e.g., past/archived sets of input data), user profile data (e.g., user background, interests, expertise, medical history) to derive a reason, cause, topic, or background circumstance that describes, explains, or narrows how the set of input data (e.g., and a particular emoji) is to be interpreted. Consider the following example. A set of input data may include the message, "Sorry, but I don't think I can eat at that restaurant . . . " Accordingly, evaluating the context of the set of input data may include examining a set of user profile data for a sender of the set of input data, and determining that the user has a number of food allergies and sensitivities that restrict what he/she can eat. Accordingly, a context of "Message sender concerned about food allergies/sensitivities," may be ascertained for the set of input data. Other methods of ascertaining the context of the set of input data are also possible.

In embodiments, the subset of the set of language attributes may be selected for the subset of the set of emoji characters at block 982. The selecting may occur based on the context of the set of input data. The selecting may occur to indicate with respect to the set of output data. Generally, selecting can include choosing, picking, deciding, nominating, or otherwise electing the subset of the set of language attributes for the subset of the set of emoji characters. In embodiments, selecting the set of language attributes may include comparing a plurality of language attributes with respect to the context of the set of input data, and identifying one or more language attributes of the set of language attributes that achieve a context relevancy threshold. For instance, consider the previous example in which the set of input data of "Sorry, but I don't think I can eat at that restaurant . . . " is associated with an emoji character depicting dice (e.g., [dice]). The [dice] emoji may be associated with a first language attribute of "Meaning1: Gambling," and a second language attribute of "Meaning2: Risk, Uncertainty." Accordingly, the first and second language attributes may be compared with the context of "Message sender concerned about food allergies/sensitivities" and it may be determined that the first language attribute of "Meaning1: Gambling" achieves a context relevancy score of "16," and that the second language attribute of "Meaning2: Risk, Uncertainty" achieves a context relevancy score of "54." In embodiments, in response to detecting that the second language attribute achieves a context relevancy threshold of "50," the second language attribute of "Meaning2: Risk, Uncertainty" may be selected for the subset of the set of emoji characters (e.g., [dice]). Other methods of selecting the subset of the set of language attributes for the subset of the set of emoji characters based on the context of the set of input data are also possible.

At block 990, a set of output data may be provided. The set of output data may indicate a subset of the set of language attributes for the subset of the set of emoji characters. At block 991, the set of output data may be provided. The set of output data may indicate the subset of the set of language attributes for the subset of the set of emoji characters in a context of the set of input data. Generally, providing can include displaying, conveying, relaying, transmitting, communicating, indicating, or otherwise presenting the set of output data which indicates the subset of the set of language attributes for the subset of the set of emoji characters in a context of the set of input data. In embodiments, providing the set of output data may include generating an interpretation of the set of input data that includes a context-aligned explanation of the subset of the set of emoji characters in relation to the natural language elements of the set of input data. For instance, the set of output data may include an annotated version of the set of input data in which one or more emoji characters are tagged with comments that indicate the nuances, hints, implications, and subtleties of the emoji character with respect to the context of the set of input data. As an example, with reference to the previous example of a set of input data including the message "Sorry, but I don't think I can eat at that restaurant . . . [dice]" the [dice] emoji may be associated with an annotation indicating that "Here, the [dice] emoji indicates the concern, apprehension, and uncertainty of the message sender with respect to an aforementioned restaurant suggestion due to the risk associated with his/her food allergies and sensitivities." Other methods of providing the set of output data are also possible.

Method 900 concludes at block 999. Aspects of method 900 may provide performance or efficiency benefits for emoji data management. Aspects may save resources such as bandwidth, disk, processing, or memory.

Figure 10:
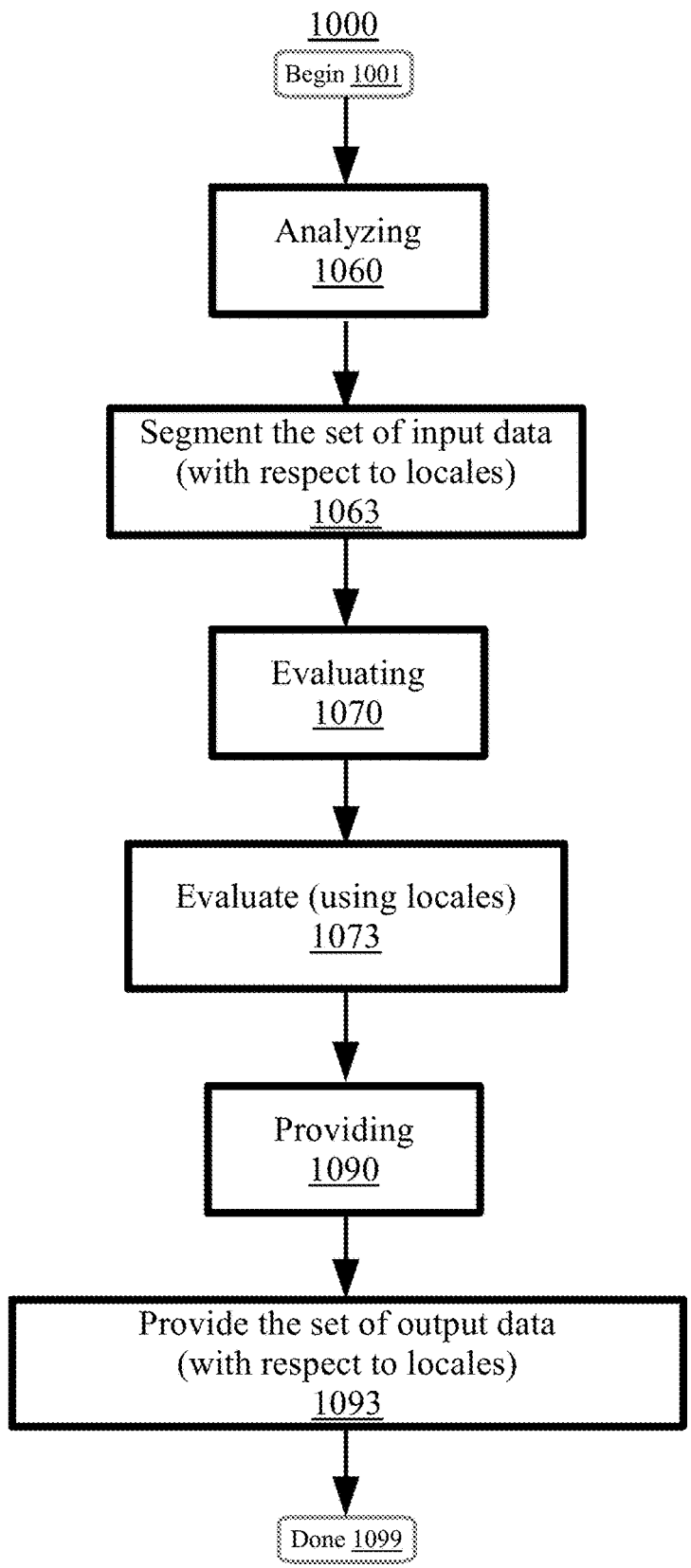
FIG. 10 is a flowchart illustrating a method for evaluating emoji meanings in a specific locale with respect to emoji data management, according to embodiments.

FIG. 10 is a flowchart illustrating a method 1000 for emoji data management. Aspects of the disclosure relate to segmenting a set of input data with respect to a set of locales to facilitate emoji character evaluation and result provision. In embodiments, aspects of method 1000 may be similar or the same as other aspects, as aspects may be utilized interchangeably with one or more methodologies described herein. Altogether, leveraging use of an emoji reference object with respect to a set of emoji characters may facilitate communication clarity, accuracy, and efficiency. The method 1000 may begin at block 1001. At block 1060, a set of input data may be analyzed. The set of input data may include a subset of the set of emoji characters.

At block 1063, the set of input data may be segmented. The segmenting may occur with respect to a set of locales. Aspects of the disclosure relate to the recognition that, in some situations, the set of input data (e.g., textual data) may include language content that does not include boundaries for dividing linguistic units (e.g., words, emoji). Accordingly, aspects of the disclosure relate to segmenting the set of input data with respect to a set of locales (e.g., to facilitate emoji character evaluation and interpretation). Generally, segmenting can include dividing, disconnecting, partitioning, splitting, segregating, breaking-down, or otherwise separating the set of input data with respect to the set of locales. The set of locales may include a collection of parameters that defines the language (e.g., Danish, Vietnamese), region (e.g., South America, Germany), and other factors that influence how the set of input data should be formatted and displayed. In embodiments, segmenting the set of input data may include detecting a locale identifier (e.g., language identifier, region identifier) with respect to a set of input data, identifying a segmentation algorithm (e.g., from a segmentation library) based on the locale identifier, and subsequently performing the segmentation algorithm on the set of input data to divide the set of input data into meaningful units such as words, sentences, or topics. In embodiments, segmenting the set of input data may include establishing a delimiter (e.g., character to define a boundary) between the words, sentences, and emoji characters. Consider the following example. A locale identifier including a language identifier of "Japanese" may be detected with respect to a set of input data. The set of input data may include the following sentence: "風邪を引いてしまったので仕事 を休みます [mask-face]" (e.g., I caught a cold, so I will take the day off of work). Accordingly, the set of input data may be segmented as follows: "((風邪)(を)(引いてしまった ので)(仕事 を)(休みます)([mask-face])" where "( )" is used as a delimiter. Other methods of segmenting the set of input data are also possible.

At block 1070, the subset of the set of emoji characters may be evaluated. The evaluating may occur using the emoji reference object. At block 1073, the subset of the set of emoji characters may be evaluated. The evaluating may occur using both the set of locales and the emoji reference object. Generally, evaluating can include appraising, investigating, examining, inspecting, or otherwise assessing the subset of the set of emoji characters using both the set of locales and the emoji reference object. In embodiments, evaluating the subset of the set of emoji characters may include utilizing the emoji reference object to compare the subset of the set of emoji characters with a set of emoji character data entries stored within the emoji reference object to identify semantic information (e.g., definitions), context-specific attributes, synonyms/antonyms, usage examples, and other language attributes that characterize the subset of the set of emoji characters. In embodiments, the locale identifier may subsequently be applied to filter the language attributes identified for the subset of emoji characters down to a subset of language attributes that achieve a validity threshold with respect to the locale indicated by the locale identifier. As an example, with respect to the [mask-face] emoji, the emoji reference object may be used to identify language attributes of "Meaning1: Doctor," "Meaning2: Dentist," "Meaning3: To be sick" and "Meaning4: Sanitation," and the locale identifier of "Japanese" may subsequently be applied to filter the language attributes down to a subset that achieve a validity threshold with respect to a locale of "Japan" (e.g., "Meaning3: To be sick" and "Meaning4: Sanitation"). Other methods of evaluating the subset of the set of emoji characters using both the set of locales and the emoji reference object are also possible.

At block 1090, a set of output data may be provided. The set of output data may indicate a subset of the set of language attributes for the subset of the set of emoji characters. At block 1093, the set of output data may be provided. The set of output data may indicate the subset of the set of language attributes for the subset of the set of emoji characters with respect to the set of locales. Generally, providing can include displaying, conveying, relaying, transmitting, communicating, indicating, or otherwise presenting the set of output data. In embodiments, providing may include generating an annotated version of the set of input data in which one or more emoji characters are tagged with comments that indicate the meaning, cultural context, and implications of the emoji character with respect to the locale. As an example, providing the set of output data may include appending the [mask-face] emoji with an annotation that states, "Here, [mask-face] indicates that the user has a cold. In Japan, people who have colds often wear masks to impede the spread of germs." In embodiments, providing the set of output data may include transmitting the annotated version of the set of input data to a user. Other methods of providing the set of output data to indicate the subset of the set of language attributes for the subset of the set of emoji characters with respect to the set of locales are also possible.

Method 1000 concludes at block 1099. Aspects of method 1000 may provide performance or efficiency benefits for emoji data management. Aspects may save resources such as bandwidth, disk, processing, or memory.

Figure 11:
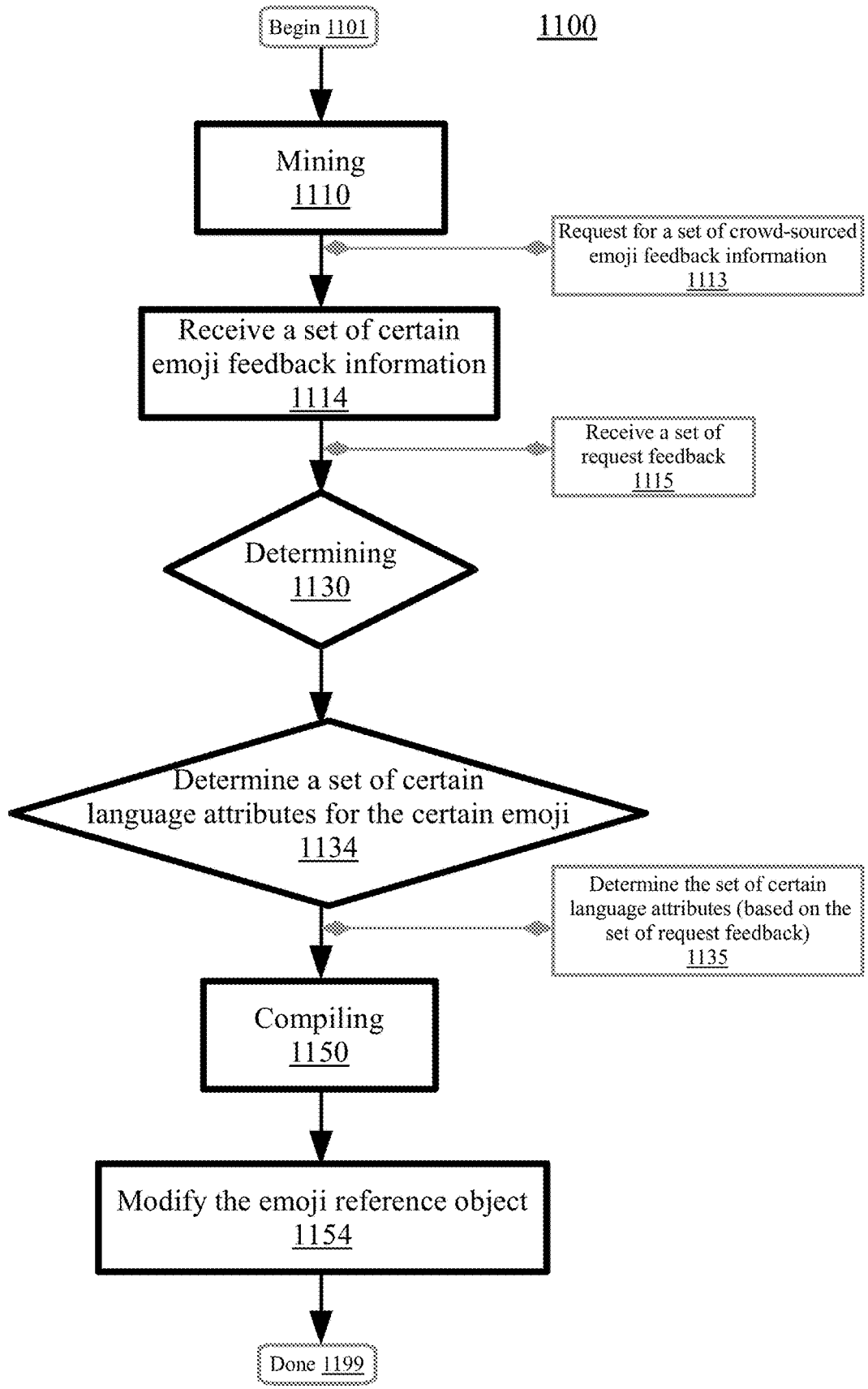
FIG. 11 is a flowchart illustrating a method for using emoji feedback information with respect to emoji data management, according to embodiments.

FIG. 11 is a flowchart illustrating a method 1100 for emoji data management. Aspects of the method 1100 relate to using emoji feedback information to modify language attributes for particular emoji characters. In embodiments, aspects of method 1100 may be similar or the same as other aspects, as aspects may be utilized interchangeably with one or more methodologies described herein. Altogether, leveraging use of an emoji reference object with respect to a set of emoji characters may facilitate communication clarity, accuracy, and efficiency. The method 1100 may begin at block 1101. At block 1110, a set of emoji usage information may be mined. The mining may occur with respect to a set of emoji characters.

In embodiments, a request for a set of crowd-sourced emoji feedback information may be published at block 1113. The publishing may occur using a crowd-sourcing technique. Generally, publishing can include issuing, announcing, disclosing, broadcasting, declaring, distributing, promulgating, communicating, or otherwise making public the request for the set of crowd-sourced emoji feedback information. The request for the set of crowd-sourced emoji feedback information may include a survey, inquiry, requisition, solicitation, or other appeal for the set of crowd-sourced emoji feedback information. In embodiments, the set of crowd-sourced emoji feedback information may include data that evaluates, assesses, offers an opinion, or comments on the accuracy, validity, relevancy, or overall efficacy of the set of emoji characters. As an example, the set of crowd-sourced feedback information may include a rating (e.g., 0-100; percentage), grading (e.g., star rating, letter-grade), or other appraisal to indicate the opinion of a user regarding how accurate (e.g., reliable, correct) the language attributes are for a particular emoji character. In embodiments, publishing the request for the set of crowd-sourced emoji feedback information may include transmitting a survey to a group of users (e.g., social media users, mobile communication application users) and instructing the group of users to provide opinions or ratings on one or more aspects (e.g., usability, accuracy, clarity) of the set of emoji characters. Other methods of publishing the request for the set of crowd-sourced emoji feedback information are also possible.

At block 1114, a set of certain emoji feedback information may be received. The receiving may occur with respect to a certain emoji of the set of emoji characters. Generally, receiving can include detecting, collecting, sensing, discovering, creating, recognizing, generating, obtaining, or otherwise accepting delivery of the set of certain emoji feedback information. As described herein, the set of certain emoji feedback information may include data that evaluates, assesses, offers an opinion, or comments on the accuracy, validity, relevancy, or overall efficacy of the set of emoji characters. As an example, the set of certain emoji feedback information may include a user rating of 1 star out of 5 with respect to an emoji depicting a whale (e.g., [whale]) that is associated with a language attribute of "Meaning1: Fish," as well as a comment of "Whales bare live young and thus are mammals, and not considered fish. The meaning of 'fish' for this emoji is incorrect." In embodiments, receiving the set of certain emoji feedback information may include collecting a completed survey (e.g., request for a set of crowd-sourced emoji feedback information) from a user. In embodiments, a set of request feedback may be received (e.g., detected, collected, sensed, discovered, created, recognized, generated, obtained) at block 1115. The receiving may occur related to the request for the set of crowd-sourced emoji feedback information. The set of request feedback may include a response, answer, or other reaction in response to the request for the set of crowd-sourced emoji feedback information. In embodiments, receiving the set of request feedback may include subscribing to a social media channel to which users post their thoughts, opinions, and assessments of the set of emoji characters. Other methods of receiving the set of emoji feedback information and the set of request feedback are also possible.

At block 1130, a set of language attributes for the set of emoji characters may be determined. The determining may occur based on the set of emoji usage information.

At block 1134, a set of certain language attributes of the set of language attributes for the certain emoji of the set of emoji characters may be determined. The determining may occur using the set of certain emoji feedback information. Generally, determining can include computing, formulating, detecting, calculating, deriving, identifying, or otherwise ascertaining the set of certain language attributes for the certain emoji of the set of emoji characters using the set of certain emoji feedback information. The set of certain language attributes may include revised language attributes that are determined to be more accurate, up-to-date, or correct with respect to previous language attributes. In embodiments, determining the set of certain language attributes may include utilizing a natural language processing technique to parse semantic and syntactic content of the set of crowd-sourced emoji feedback information in order to identify a group of language attributes suggested or recommended by users for a particular emoji character. As an example, consider an emoji character depicting a bird in a cage (e.g., [caged-bird]) that is associated with a language attribute of "Meaning1: Pet". In embodiments, determining the set of certain language attributes may include analyzing a set of crowd-sourced emoji feedback information including a set of 30 survey responses, and ascertaining that a threshold number of users (e.g., 60% of users) indicate that the most common usage of the [caged-bird] emoji is to represent the idea of "captivity," or "lack of freedom." Accordingly, in response to ascertaining that a threshold number of users indicate a revised language attribute of "captivity" for the [caged-bird] emoji, "captivity" may be determined to be a certain language attribute (e.g., revised, updated) for the [caged-bird] emoji. In embodiments, the set of certain language attributes of the set of language attributes for the certain emoji of the set of emoji characters may be determined (e.g., computed, formulated, detected, calculated, derived, identified, ascertained) at block 1135. The determining may occur based on the set of request feedback. In embodiments, determining the set of certain language attributes may include using a crowd-sourcing technique to poll a set of users regarding updates or revisions to language attributes for one or more emoji characters, and identifying one or more suggested/recommended language attributes as the set of certain language attributes. Other methods of determining the set of certain language attributes for the certain emoji of the set of emoji characters are also possible.

At block 1150, an emoji reference object may be compiled. The compiling may occur using the set of language attributes for the set of emoji characters.

At block 1154, the emoji reference object may be modified. The modifying may occur using the set of certain language attributes of the set of language attributes for the certain emoji of the set of emoji characters. Aspects of the disclosure relate to the recognition that, in some situations, emoji characters may evolve in meaning and usage over time. Accordingly, aspects of the disclosure relate to updating the emoji reference object based on feedback from users. Generally, modifying can include adapting, adjusting, correcting, revising, altering, or otherwise changing the emoji reference object using the set of certain language attributes. In embodiments, modifying the emoji reference object may include adding data entries for new emoji characters or language attributes, removing data entries for emoji characters or language attributes that have fallen out of usage, or changing an existing data entry for an emoji character or language attribute. In embodiments, modifying the emoji reference object may include updating a data entry for a particular emoji character to add a new (e.g., revised, up-to-date) language attribute (e.g., of the set of certain language attributes) based on a set of crowd-sourced emoji feedback information. Consider the previous example in which a language attribute of "Meaning: Captivity" is determined for a [caged-bird] emoji character based on a set of crowd-sourced emoji feedback information. Accordingly, in embodiments, modifying may include generating a new data entry for the language attribute of "Meaning: Captivity," and linking it to the [caged-bird emoji]. Other methods of modifying the emoji reference object using the set of certain language attributes are also possible.

Method 1100 concludes at block 1199. Aspects of method 1100 may provide performance or efficiency benefits for emoji data management. Aspects may save resources such as bandwidth, disk, processing, or memory.

Figure 12:
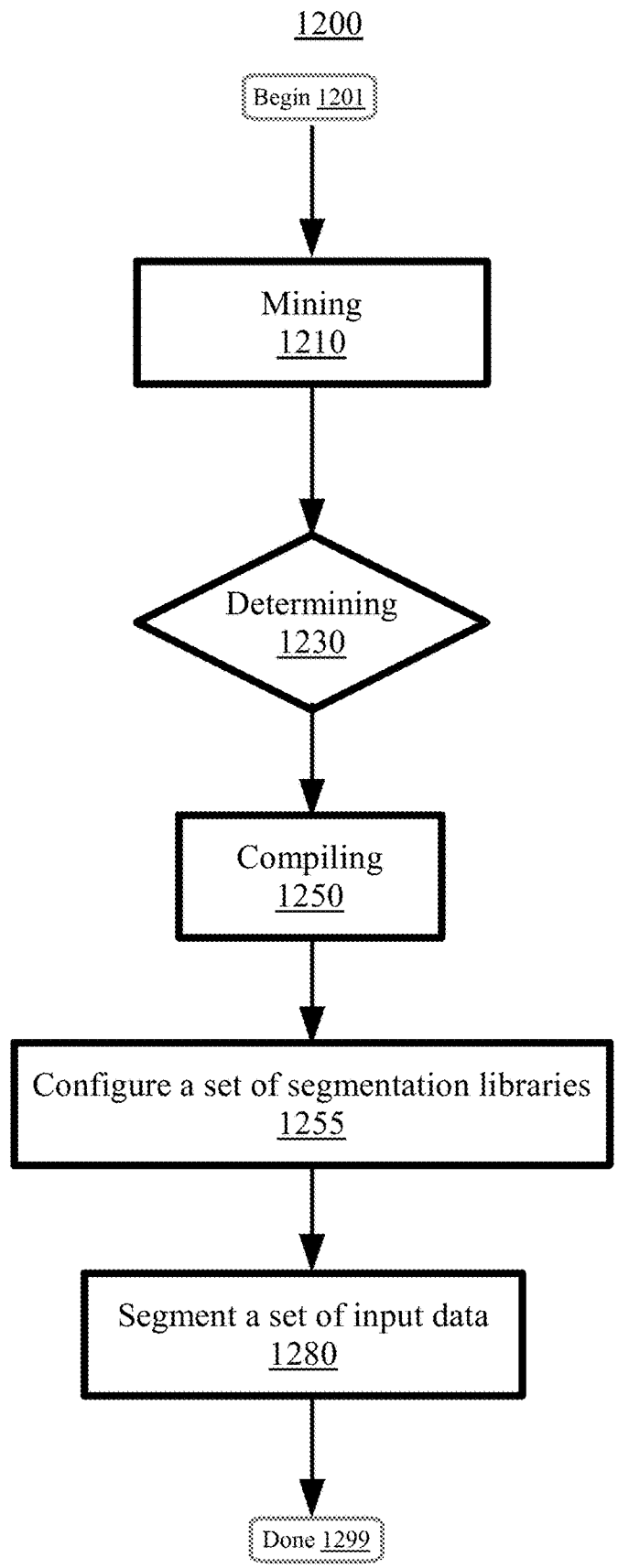
FIG. 12 is a flowchart illustrating a method for configuring a set of segmentation libraries to use emoji data management, according to embodiments.

FIG. 12 is a flowchart illustrating a method 1200 for emoji data management. Aspects of the method 1200 relate to configuring a set of segmentation libraries using a set of language attributes, and using the set of segmentation libraries to segment a set of input data. In embodiments, aspects of method 1200 may be similar or the same as other aspects, as aspects may be utilized interchangeably with one or more methodologies described herein. The method 1200 may begin at block 1201. At block 1210, a set of emoji usage information may be mined. The mining may occur with respect to a set of emoji characters. At block 1230, a set of language attributes for the set of emoji characters may be determined. The determining may occur based on the set of emoji usage information. At block 1250, an emoji reference object may be compiled. The compiling may occur using the set of language attributes for the set of emoji characters.

At block 1255, a set of segmentation libraries may be configured. The configuring may occur using the set of language attributes for the set of emoji characters. Generally, configuring can include programming, initializing, constructing, setting-up, updating, organizing, formatting, or arranging the set of segmentation libraries using the set of language attributes for the set of emoji characters. The set of segmentation libraries may include corpora, repositories, indices, or other collections of rules that define how text corresponding to a particular locale is to be segmented (e.g., split or divided into meaningful units). In embodiments, configuring the set of segmentation libraries may include generating a segmentation rule, updating an existing segmentation rule, deleting a segmentation rule, or assigning a conditional to a segmentation rule (e.g., to perform the segmentation rule in response to the condition being met) based on the set of language attributes. For instance, in certain embodiments, a particular language attribute may indicate that a particular emoji character is used as a prefix, a suffix, or part of a compound emoji phrase, and thus should not be split up from an adjoining character (e.g., emoji character or natural language character). Accordingly, configuring the set of segmentation libraries may include defining a new segmentation rule that specifies that the particular emoji character associated with the particular language attribute should not be separated from an adjoining character during segmentation. Other methods of configuring the set of segmentation libraries are also possible.

At block 1280, a set of input data may be segmented. The segmenting may occur using the set of segmentation libraries. Generally, segmenting can include dividing, disconnecting, partitioning, splitting, segregating, breaking-down, or otherwise separating the set of input data using the set of segmentation libraries. In embodiments, segmenting the set of input data using the set of segmentation libraries may include detecting a locale identifier with respect to a set of input data (e.g., China), identifying a segmentation library (e.g., Mandarin) based on the locale identifier, and applying a set of segmentation rules with respect to the set of input data as indicated by the segmentation library. As described herein, segmenting the set of input data may include detecting word boundaries and splitting the set of input data up into words, detecting sentence boundaries and separating the set of input data into discrete sentences, ascertaining topics and dividing the set of input data into topical segments, or the like. Consider the following example. A set of input data may include the following sentence in Mandarin: "我 不餓 [thumbs-down]" (e.g., "I am not hungry[thumbs-down]). Accordingly, in embodiments, a set of segmentation rules indicated by the Mandarin segmentation library may be applied to the set of input data, and the set of input data may be segmented as follows "(我)(不)(餓) ([thumbs-down])" where "( )" acts as a delimiter. Other methods of segmenting the set of input data using the set of segmentation libraries are also possible.

Method 1200 concludes at block 1299. Aspects of method 1200 may provide performance or efficiency benefits for emoji data management. Aspects may save resources such as bandwidth, disk, processing, or memory.

Figure 13:
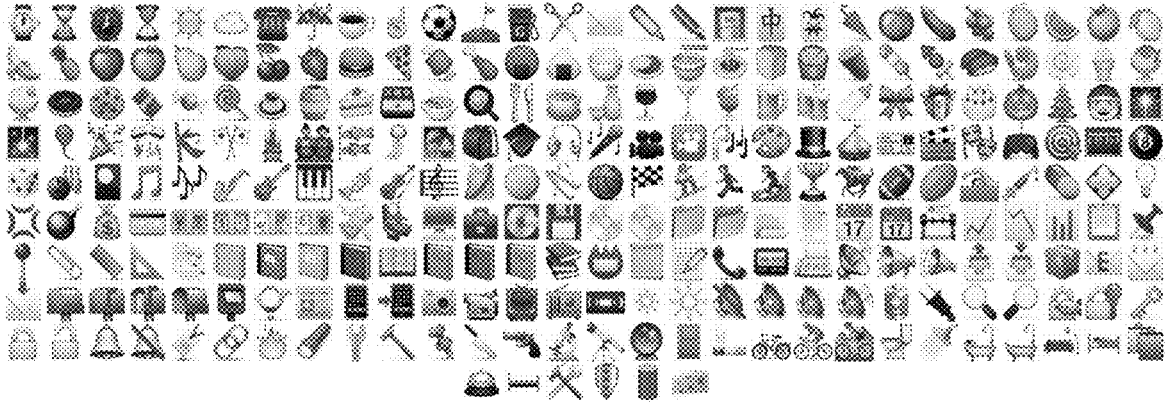
FIG. 13 shows an example set of emoji characters, according to embodiments.

FIG. 13 shows an example set of emoji characters, according to embodiments. Aspects of FIG. 13 relate to a collection of individual emoji characters as well as compound emoji phrases that may be managed using the emoji data management steps and techniques described herein. A set of emoji characters 1310 may include a collection of one or more pictographs or ideograms for representing facial expressions, objects, weather conditions, animals, or other concepts. As examples, the set of emoji characters my include happy/smiley faces, hearts, clocks, food items, fireworks, soccer balls, rain falling on an umbrella, music notes, or the like. In embodiments, aspects of the disclosure relate to the recognition that emoji characters may be grouped together in emoji phrases (e.g., that may be locale, language, or user-group specific). For instance, a set of English-language emoji phrases 1320 may include emoji phrases that use two or more emoji to express a concept, thought, or expression (e.g., that may be known or familiar to English-language speakers). As an example, an emoji depicting a distressed face followed by a food item may indicate a meaning of "I'm hungry." As another example, a set of Chinese-language emoji phrases 1330 may include emoji phrases that that use two or more emoji to express a concept, thought, or expression (e.g., that may be known or familiar to Chinese-language speakers). As an example, a string of emoji depicting a flower, a moneybag, a moon, and a finger pointing down may indicate a meaning of "Romantic Setting" (e.g., surrounded by flowers underneath a golden moon). Other examples of emoji characters and emoji phrases beyond those illustrated herein are also possible.

Figure 14:
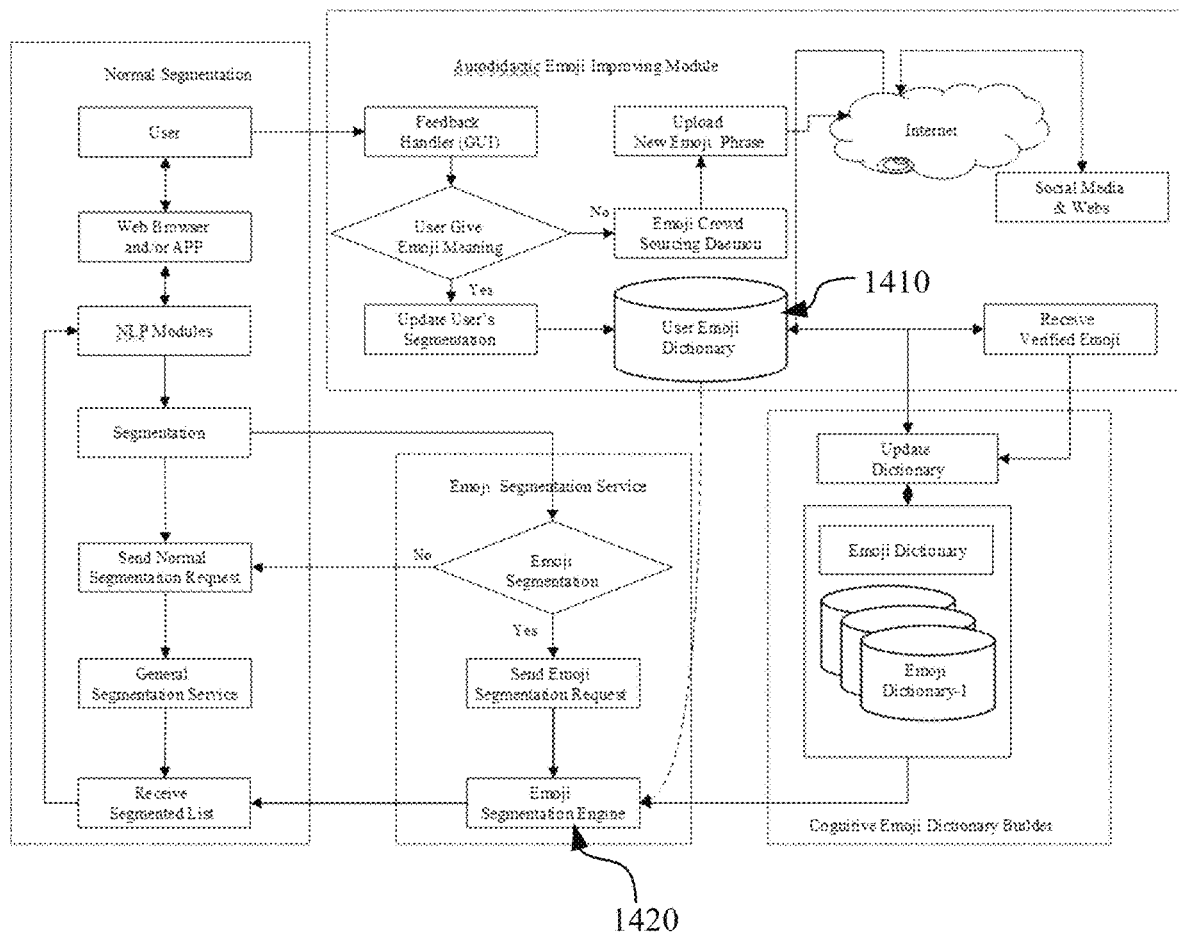
FIG. 14 shows an example system for using emoji data management, according to embodiments.

FIG. 14 shows an example system 1400 for emoji data management, according to embodiments. Aspects of the example system 1400 illustrate how an emoji dictionary 1410 may be used to facilitate performance of natural language text segmentation by an emoji segmentation engine 1420. As described herein, the emoji dictionary 1410 (e.g., emoji reference object) may include a database, index, repository, or other lexical resource configured to maintain the set of emoji characters in association with a set of language attributes (e.g., meaning, name, related forms, synonyms, antonyms, etymology, origin, cultural specific usages). The emoji dictionary 1410 may be communicatively connected (e.g., local area connection, same distributed cloud environment, virtual machines on communicatively connected hosts) with the emoji segmentation engine 1420. In embodiments, the emoji segmentation engine may include a hardware component or software component configured to parse natural language content and segment natural language elements as well as emoji characters. As described herein, the emoji segmentation engine 1420 may be configured to access the emoji dictionary 1410 to derive segmentation rules based on the language attributes collected for the set of emoji characters. Other methods of using the example system 1400 for emoji data management are also possible.

Figure 15:
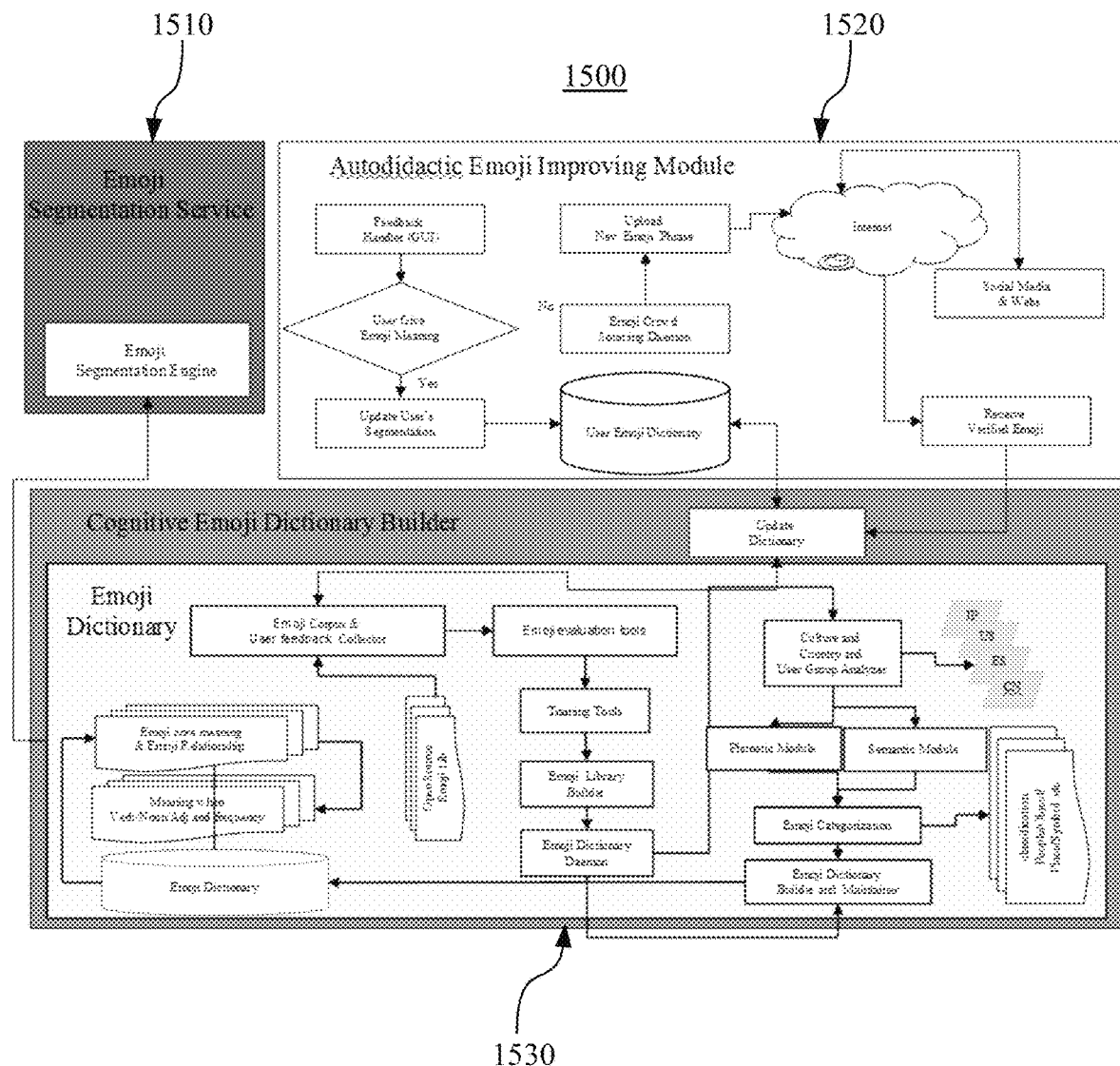
FIG. 15 shows an example system for implementing emoji data management, according to embodiments.

FIG. 15 shows an example system 1500 for emoji data management, according to embodiments. Aspects of the example system 1500 illustrate an example system infrastructure for emoji data management using an emoji segmentation service 1510, an autodidactic emoji improving module 1520, and a cognitive emoji dictionary builder 1530. As described herein, the cognitive emoji dictionary builder 1530 may be configured to mine a set of emoji usage information (e.g., from social media, emails, messages), determine a set of language attributes for the set of emoji characters (e.g., meaning, name, related forms, synonyms, antonyms, etymology, origin, cultural specific usages), and compile an emoji dictionary. The emoji dictionary may include information regarding phonetic information, semantic information, categorization, locale (e.g., culture, country, user group) differences, core meanings, emoji relationships, meanings as different parts of speech (e.g., verb, noun, adjective), usage frequency, usage cases, and other data for a set of emoji characters. In embodiments, the autodidactic emoji improving module 1520 may be configured to receive (e.g., collect, capture) emoji feedback information (e.g., from a set of users) using a crowd-sourcing technique, and dynamically update and revise the emoji dictionary. For instance, the autodidactic emoji improving module 1520 may be configured to identify language new or updated language attributes for existing emoji characters, detect the usage of new emoji characters, or ascertain that particular emoji characters have fallen out of usage, and subsequently modify the emoji dictionary based on the feedback information. In embodiments, the emoji segmentation service 1510 may be configured to segment natural language elements and emoji characters based on the language attributes maintained for the set of emoji characters in the emoji dictionary. As such, the emoji segmentation service 1510, the autodidactic emoji improving module 1520, and the cognitive emoji dictionary builder may be leveraged to facilitate communication clarity, accuracy, and efficiency. Other methods of using the example system 1500 for emoji data management are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for depictogram management, the method comprising:
   mining, with respect to a set of depictograms, a set of depictogram usage information from user generated content;
   determining, programmatically, based on the set of depictogram usage information, a set of language attributes for the set of depictograms;
   compiling, programmatically, using the set of language attributes for the set of depictograms, a depictogram reference object that maintains language attributes for one or more of languages, cultures, locales, and user groups;
   analyzing, programmatically, a set of input data which includes a subset of the set of depictograms;
   evaluating, programmatically, using a processor that accesses computer memory containing the depictogram reference object, the subset of the set of depictograms to determine a subset of the set of language attributes for the subset of the set of depictograms; and
   providing, programmatically, a set of output data which indicates the subset of the set of language attributes for the subset of the set of depictograms.

2. The method of claim 1, further comprising:
   configuring the set of depictograms to include a set of emoji characters that indicate a set of picture characters which corresponds to a non-emotional-state feature.

3. The method of claim 1, wherein the set of depictograms includes a set of emoji characters, and further comprising:
   searching an accessible environment for a set of use-cases of the set of emoji characters; and
   collecting, from the accessible environment, a set of emoji-use context data which corresponds with the set of use-cases of the set of emoji characters.

4. The method of claim 3, further comprising:
   extracting, to collect the set of emoji-use context data which corresponds with the set of use-cases of the set of emoji characters, a semantic factor associated with a first topic; and
   extracting, to collect the set of emoji-use context data which corresponds with the set of use-cases of the set of emoji characters, a sentiment factor that indicates a first emotion with respect to the first topic.

5. The method of claim 1, wherein the set of depictograms includes a set of emoji characters, and further comprising:
   normalizing, with respect to a first specific language, a first relationship of the set of emoji characters and the set of language attributes, wherein the first relationship includes a respective emoji of the set of emoji characters and a first respective language attribute of the set of language attributes; and
   normalizing, with respect to a second specific language, a second relationship of the set of emoji characters and the set of language attributes, wherein the second relationship includes the respective emoji of the set of emoji characters and a second respective language attribute of the set of language attributes.

6. The method of claim 1, wherein the set of depictograms includes a set of emoji characters, and further comprising:
   normalizing, with respect to a first user-group, a first relationship of the set of emoji characters and the set of language attributes, wherein the first relationship includes a respective emoji of the set of emoji characters and a first respective language attribute of the set of language attributes; and normalizing, with respect to a second user-group, a second relationship of the set of emoji characters and the set of language attributes, wherein the second relationship includes the respective emoji of the set of emoji characters and a second respective language attribute of the set of language attributes.

7. The method of claim 1, wherein the set of depictograms includes a set of emoji characters, wherein the depictogram reference object includes an emoji reference object, and further comprising:

receiving, with respect to a certain emoji of the set of emoji characters, a set of certain emoji feedback information;

determining, using the set of certain emoji feedback information, a set of certain language attributes of the set of language attributes for the certain emoji of the set of emoji characters; and modifying, using the set of certain language attributes of the set of language attributes for the certain emoji of the set of emoji characters, the emoji reference object.

8. The method of claim 7, further comprising:
publishing, using a crowd-sourcing technique, a request for a set of crowd-sourced emoji feedback information;
receiving, related to the request for the set of crowd-sourced emoji feedback information, a set of request feedback; and
determining, based on the set of request feedback, the set of certain language attributes of the set of language attributes for the certain emoji of the set of emoji characters.

9. The method of claim 1, wherein the set of depictograms includes a set of emoji characters, and further comprising:
configuring, using the set of language attributes for the set of emoji characters, a set of segmentation libraries; and
segmenting, using the set of segmentation libraries, a set of input data.

10. The method of claim 9, further comprising:
detecting, with respect to a set of input data, a locale identifier for a first locale;
identifying, based on the locale identifier for the locale, a first segmentation library of the set of segmentation libraries that corresponds to the first locale; and
applying, with respect to the set of input data to segment the set of input data, a first set of segmentation rules indicated by the first segmentation library of the set of segmentation libraries.

11. The method of claim 1, further comprising:
executing, in a dynamic fashion to streamline depictogram management, each of:
the mining, the determining, and the compiling.

12. The method of claim 1, further comprising:
executing, in an automated fashion without user intervention, each of:
the mining, the determining, and the compiling.

13. A computer-implemented method for depictogram management, the method comprising:
mining, with respect to a set of depictograms, a set of depictogram usage information from user generated content;
determining, programmatically, based on the set of depictogram usage information, a set of language attributes for the set of depictograms;
compiling, programmatically, using the set of language attributes for the set of depictograms, a depictogram reference object that maintains language attributes for one or more of languages, cultures, locales, and user groups;
analyzing, programmatically, a set of input data which includes a subset of the set of depictograms;
evaluating, programmatically, using a processor that accesses computer memory containing the depictogram reference object, the subset of the set of depictograms to determine a subset of the set of language attributes for the subset of the set of depictograms; and
providing, programmatically, a set of output data which indicates the subset of the set of language attributes for the subset of the set of depictograms,
wherein the set of depictograms includes a set of emoji characters, and further comprising:
creating, to map the set of emoji characters with the set of language attributes, a data structure;
populating, using a first emoji information source, a first language attribute which corresponds with a particular emoji in a particular record of the data structure; and
populating, using a second emoji information source, a second language attribute which corresponds with the particular emoji in the particular record of the data structure.

14. The method of claim 13, further comprising:
ascertaining that the first emoji information source includes an emoji authority; and
ascertaining that the second emoji information source includes a discovered socialistic notation.

15. The method of claim 1, wherein the set of depictograms includes a set of emoji characters which has a subset of the set of emoji characters, wherein the depictogram reference object includes an emoji reference object, and further comprising:
segmenting, with respect to a set of locales, the set of input data;
evaluating, using both the set of locales and the emoji reference object, the subset of the set of emoji characters; and
providing the set of output data which indicates the subset of the set of language attributes for the subset of the set of emoji characters with respect to the set of locales.

16. A computer-implemented method for depictogram management, the method comprising:
mining, with respect to a set of depictograms, a set of depictogram usage information from user generated content;
determining, programmatically, based on the set of depictogram usage information, a set of language attributes for the set of depictograms;
compiling, programmatically, using the set of language attributes for the set of depictograms, a depictogram reference object that maintains language attributes for one or more of languages, cultures, locales, and user groups;
analyzing, programmatically, a set of input data which includes a subset of the set of depictograms;
evaluating, programmatically, using a processor that accesses computer memory containing the depictogram reference object, the subset of the set of depictograms to determine a subset of the set of language attributes for the subset of the set of depictograms; and
providing, programmatically, a set of output data which indicates the subset of the set of language attributes for the subset of the set of depictograms, wherein the set of depictograms includes a set of emoji characters which has a subset of the set of emoji characters, and further comprising:
receiving the set of input data;
filtering the set of input data to have:
  a first portion of the set of input data which has a set of natural language elements, and
  a second portion of the set of input data which has the subset of the set of emoji characters;
evaluating, using a natural language processing technique, the first portion of the set of input data; and
providing the set of output data which indicates the subset of the set of language attributes for the subset of the set of emoji characters in a context of the set of input data.

17. The method of claim 16, further comprising:
ascertaining, based on evaluating the first portion of the set of input data using the natural language processing technique, the context of the set of input data; and
selecting, based on the context of the set of input data, the subset of the set of language attributes for the subset of the set of emoji characters to indicate with respect to the set of output data.

18. A system for depictogram management, the system comprising:
a memory having a set of computer readable computer instructions, and
a processor for executing the set of computer readable instructions, the set of computer readable instructions including:
mining, with respect to a set of depictograms, a set of depictogram usage information from user generated content;
determining, based on the set of depictogram usage information, a set of language attributes for the set of depictograms;
compiling, using the set of language attributes for the set of depictograms, a depictogram reference object that maintains language attributes for one or more of languages, cultures, locales, and user groups;
analyzing a set of input data which includes a subset of the set of depictograms;
evaluating, using a processor that accesses computer memory containing the depictogram reference object, the subset of the set of depictograms to determine a subset of the set of language attributes for the subset of the set of depictograms; and
providing a set of output data which indicates the subset of the set of language attributes for the subset of the set of depictograms.

19. A computer program product for depictogram management, the computer program product comprising a computer readable storage medium having program instructions embodied therewith, wherein the computer readable storage medium is not a transitory signal per se, the program instructions executable by a processor to cause the processor to perform a method comprising:
mining, with respect to a set of depictograms, a set of depictogram usage information from user generated electronic content;
determining, programmatically, based on the set of depictogram usage information, a set of language attributes for the set of depictograms;
compiling, programmatically, using the set of language attributes for the set of depictograms, a depictogram reference object that maintains language attributes for one or more of languages, cultures, locales, and user groups;
analyzing, programmatically, a set of input data which includes a subset of the set of depictograms;
evaluating, programmatically, using a processor that accesses computer memory containing the depictogram reference object, the subset of the set of depictograms to determine a subset of the set of language attributes for the subset of the set of depictograms; and
providing, programmatically, a set of output data which indicates a subset of the set of language attributes for the subset of the set of depictograms.

* * * * *